US012581056B2

(12) United States Patent
Kim

(10) Patent No.: US 12,581,056 B2
(45) Date of Patent: Mar. 17, 2026

(54) METHOD AND APPARATUS FOR ENCODING/DECODING IMAGE

(71) Applicant: B1 INSTITUTE OF IMAGE TECHNOLOGY, INC., Seoul (KR)

(72) Inventor: Ki Baek Kim, Seoul (KR)

(73) Assignee: B1 INSTITUTE OF IMAGE TECHNOLOGY, INC., Seoul (KR)

( * ) Notice: Subject to any disclaimer, the term of this patent is extended or adjusted under 35 U.S.C. 154(b) by 0 days.

(21) Appl. No.: 18/775,486

(22) Filed: Jul. 17, 2024

(65) Prior Publication Data

US 2025/0016302 A1 Jan. 9, 2025

Related U.S. Application Data

(63) Continuation of application No. 17/680,674, filed on Feb. 25, 2022, now Pat. No. 12,075,026, which is a
(Continued)

(30) Foreign Application Priority Data

Apr. 1, 2018 (KR) ........................ 10-2018-0037812

(51) Int. Cl.
*H04N 19/103* (2014.01)
*H04N 19/119* (2014.01)
(Continued)

(52) U.S. Cl.
CPC ......... *H04N 19/103* (2014.11); *H04N 19/119* (2014.11); *H04N 19/176* (2014.11); *H04N 19/593* (2014.11)

(58) Field of Classification Search
CPC .. H04N 19/103; H04N 19/119; H04N 19/176; H04N 19/593; H04N 19/129;
(Continued)

(56) References Cited

U.S. PATENT DOCUMENTS

| 9,686,555 B2 | 6/2017 | Song et al. |
| 2010/0086032 A1 | 4/2010 | Chen et al. |

(Continued)

FOREIGN PATENT DOCUMENTS

| CN | 102172021 A | 8/2011 |
| CN | 103299623 A | 9/2013 |

(Continued)

OTHER PUBLICATIONS

"Adaptive Scan for Large Blocks for HEVC," Yue Yu, et al., Joint Collaborative Team on Video Coding (JCT~VC) of ITU-T SG 16 WP3 and ISO/IEC JTC1/SC29/WG11, 6th Meeting: Torino, IT, Jul. 14-22, 2011.
(Continued)

*Primary Examiner* — Nam D Pham

(57) ABSTRACT

The objective of the present invention is to provide a method and an apparatus for intra-prediction. In addition, the objective of the present invention is to provide a method and an apparatus for intra-prediction on a subblock unit basis. Furthermore, the objective of the present invention is to provide a method and an apparatus for determining a division and an encoding order of subblock units.

7 Claims, 15 Drawing Sheets

Related U.S. Application Data continuation of application No. 17/040,765, filed as application No. PCT/KR2019/003777 on Apr. 1, 2019, now Pat. No. 11,297,309.

(51) Int. Cl.
  *H04N 19/176* (2014.01)
  *H04N 19/593* (2014.01)

(58) Field of Classification Search
  CPC .... H04N 19/157; H04N 19/61; H04N 19/117; H04N 19/124; H04N 19/105; H04N 19/159; H04N 19/52
  See application file for complete search history.

(56) References Cited

U.S. PATENT DOCUMENTS

| | | | |
|---|---|---|---|
| 2012/0008675 | A1 | 1/2012 | Karczewicz et al. |
| 2013/0034157 | A1 | 2/2013 | Helle et al. |
| 2013/0039422 | A1 | 2/2013 | Kirchhoffer et al. |
| 2013/0128964 | A1 | 5/2013 | Chien et al. |
| 2015/0195566 | A1 | 7/2015 | Hinz et al. |
| 2015/0261884 | A1 | 9/2015 | Pang et al. |
| 2016/0057447 | A1 | 2/2016 | Pu et al. |
| 2016/0330451 | A1 | 11/2016 | Seregin et al. |
| 2016/0330480 | A1 | 11/2016 | Liu et al. |
| 2017/0118472 | A1 | 4/2017 | Song et al. |
| 2017/0347096 | A1 | 11/2017 | Hong et al. |
| 2017/0353721 | A1 | 12/2017 | Piao et al. |
| 2018/0070110 | A1 | 3/2018 | Chuang et al. |
| 2018/0115787 | A1 | 4/2018 | Koo et al. |
| 2019/0116381 | A1* | 4/2019 | Lee ..................... H04N 19/593 |
| 2019/0253707 | A1 | 8/2019 | Ryu et al. |

FOREIGN PATENT DOCUMENTS

| | | | |
|---|---|---|---|
| CN | 107566848 | A | 1/2018 |
| JP | 2013098957 | A | 5/2013 |
| JP | 2014519764 | A | 8/2014 |
| JP | 2017-139758 | A | 8/2017 |
| JP | 2017-192011 | A | 10/2017 |
| JP | 2018066716 | A | 4/2018 |
| JP | 2019530351 | A | 10/2019 |
| JP | 2020509714 | A | 3/2020 |
| KR | 10-2015-0074201 | A | 7/2015 |
| KR | 20170058866 | A | 5/2017 |
| KR | 10-2017-0122351 | A | 11/2017 |
| KR | 10-2018-0019008 | A | 2/2018 |
| RU | 2 648 571 | C2 | 8/2016 |
| RU | 2619706 | C2 | 5/2017 |
| WO | 2011128365 | A1 | 10/2011 |
| WO | 2012045886 | A1 | 4/2012 |
| WO | 2012059577 | A1 | 5/2012 |
| WO | 2012140889 | A1 | 10/2012 |
| WO | WO 2012/176406 | A1 | 12/2012 |
| WO | WO 2013/074964 | A1 | 5/2013 |
| WO | 2014053517 | A1 | 4/2014 |
| WO | WO 2014/049982 | A1 | 4/2014 |
| WO | 2016167538 | A1 | 10/2016 |
| WO | WO 2017/090967 | A1 | 6/2017 |
| WO | WO 2017/131233 | A1 | 8/2017 |
| WO | WO 2017/146526 | A1 | 8/2017 |
| WO | WO 2017/160117 | A1 | 9/2017 |
| WO | 2017192011 | A2 | 11/2017 |
| WO | WO 2017/188652 | A1 | 11/2017 |
| WO | 2019189904 | A1 | 2/2021 |

OTHER PUBLICATIONS

Cao, Xiaoran et al., "CE6.b Report on Short Distance Intra Prediction Method", *Joint Video Exploration Team (JVET) of ITU-T SG16 WP3 and ISO/IEC JTC1/SC29/WG11*, 4th Meeting: Daegu, Republic of Korea, Jan. 20-28, 2011 (pp. 1-8).

Kim, Il-Koo, et al. "High Efficiency Video Coding (HEVC) Test Model 10 (HM10) Encoder Description" JCTVC-L1002_v3, Joint Collaborative Team on Video Coding (JCT-VC) of ITU-T SG16 WP3 and ISO/IEC JTC1/SC29/WG11, 12th Meeting: Geneva, CH, Jan. 14-23, 2013, (6 pages).

Bross, Benjamin, et al. "High Efficiency Video Coding (HEVC) text specification draft 10 (for FDIS & Last Call)" JCTVC-L1003_v34, Joint Collaborative Team on Video Coding (JCT-VC) of ITU-T SG16 WP3 and ISO/IEC JTC1/SC29/WG11, 12th Meeting: Geneva, CH, Jan. 14-23, 2013, (7 pages).

Seregin, Vadim et al., "Neighbor based intra most probable modes list derivation", *Joint Video Exploration Team (JVET) of ITU-T SG 16 WP 3 and ISO/IEC Jtc 1/SC 29/WG 11*, 3rd Meeting: Geneva, Switzerland, May 26-Jun. 1, 2016 (pp. 1-4).

Li, Jiahao et al., "Multiple line-based intra prediction", *Joint Video Exploration Team (JVET) of ITU-T SG 16 WP 3 and ISO/IEC JTC 1/SC 29/WG 11*, 3rd Meeting: Geneva, Switzerland, May 26-Jun. 1, 2016 (pp. 1-6).

Chang, Yao-Jen et al., "EE6: Arbitrary Reference Tier for Intra Directional Modes, with Supplementary Results", *Joint Video Exploration Team (JVET) of ITU-T SG 16 WP 3 and ISO/IEC JTC 1/SC 29/WG 11*, 4th Meeting, Chengdu, Peoples Republic of China, Oct. 15-21, 2016 (pp. 1-6).

Chen, Jianle et al., "Algorithm Description of Joint Exploration Test Model 5 (JEM 5)", *Joint Video Exploration Team (JVET) of ITU-T SG 16 WP 3 and ISO/IEC JTC 1/SC 29/WG 11*, 5th Meeting: Geneva, Switzerland, Jan. 12-20, 2017 (pp. 1-44).

International Search Report issued on Jul. 2, 2019 in counterpart International Patent Application No. PCT/KR2019/003443 (2 pages in English and 2 pages in Korean).

Korean Office Action issued on Aug. 20, 2020 in counterpart Korean Patent Application No. 10-2020-7000412 (8 pages in English).

Russian Office Action issued on Apr. 1, 2019 in counterpart Russian Patent Application No. 2020134739/07(063803) (7 pages in English, 8 pages in Russian).

Amin Zheng, et al. "Adaptive Block Coding Order for Intra Prediction in HEVC," IEEE Transactions on Circuit and Systems For Video Technology, vol. 26, Issue: 11, Nov. 2016, pp. 2152-2158.

Shohei Matsuo et al.,"A Study on a Generation Method for Reference Pixels of HEVC Intra Prediction" Jul. 25, 2025. cited in Japanese Patent Application No. 2024-109796.

Yue Yu, "Adaptive Scan for Large Blocks for HEVC," Joint Collaborative Team on Video Coding (JCT-VC) of ITU-T SG16 WP3 and ISO/IEC JTC1/SC29/WG11, 6th Meeting: Torino, IT, Jul. 12-22, 2011, JCTVC-F569_r2m.

* cited by examiner

METHOD AND APPARATUS FOR ENCODING/DECODING IMAGE

CROSS REFERENCE TO RELATED APPLICATIONS

This application is a continuation of application Ser. No. 17/680,674 filed on Feb. 25, 2022, which is a continuation of application Ser. No. 17/040,765 filed on Sep. 23, 2020, which is now U.S. Pat. No. 11,297,309, which claims the benefit of U.S. National Stage Application of International Application No. PCT/KR2019/003777, filed on Apr. 1, 2019, and published as WO 2019/194485 on Oct. 10, 2019. This application and PCT/KR2019/003777 claim the benefit under 35 USC 119(a) and 365(b) of Korean Patent Application No. 10-2018-0037812 filed on Apr. 1, 2018 in the Korean Intellectual Property Office. The disclosures of PCT/KR2019/003777 and Korean Patent Application No. 10-2018-0037812 are incorporated herein by reference.

TECHNICAL FIELD

The present disclosure relates to a technique of encoding and decoding an image, and more particularly, to a method and apparatus for performing encoding/decoding in intra-prediction.

BACKGROUND ART

Along with the widespread use of the Internet and portable terminals and the development of information and communication technology, multimedia data is increasingly being used. Accordingly, in order to provide various services or perform various tasks through image prediction in various systems, there is a pressing need for improving the performance and efficiency of an image processing system. However, research and development achievements are yet to catch up with the trend.

As such, an existing method and apparatus for encoding/decoding an image needs performance improvement in image processing, particularly in image encoding or image decoding.

DISCLOSURE

Technical Problem

It is an object of the present disclosure to provide a method and apparatus for performing intra-prediction. It is another object of the present disclosure to provide a method and apparatus for performing subblock-wise intra-prediction. It is another object of the present disclosure to provide a method and apparatus for performing partitioning into subblocks and determining a coding order of the subblocks.

Technical Solution

In a method and apparatus for image encoding/decoding according to the present disclosure, a candidate group of partition types for a current block is configured, and a partition type of the current block into subblocks is determined based on the candidate group and a candidate index, an intra-prediction mode is derived in units of the current block, and the current block is intra-predicted based on the intra-prediction mode of the current block and the partition type.

Advantageous Effects

According to the present disclosure, encoding/decoding performance may be improved through subblock-wise intra-prediction. Further, according to the present disclosure, prediction accuracy may be increased by efficiently configuring a candidate group of subblock-wise partition types. Further, according to the present disclosure, intra-prediction encoding/decoding efficiency may be improved by adapting a subblock-wise coding order.

BEST MODE

Figure 1:
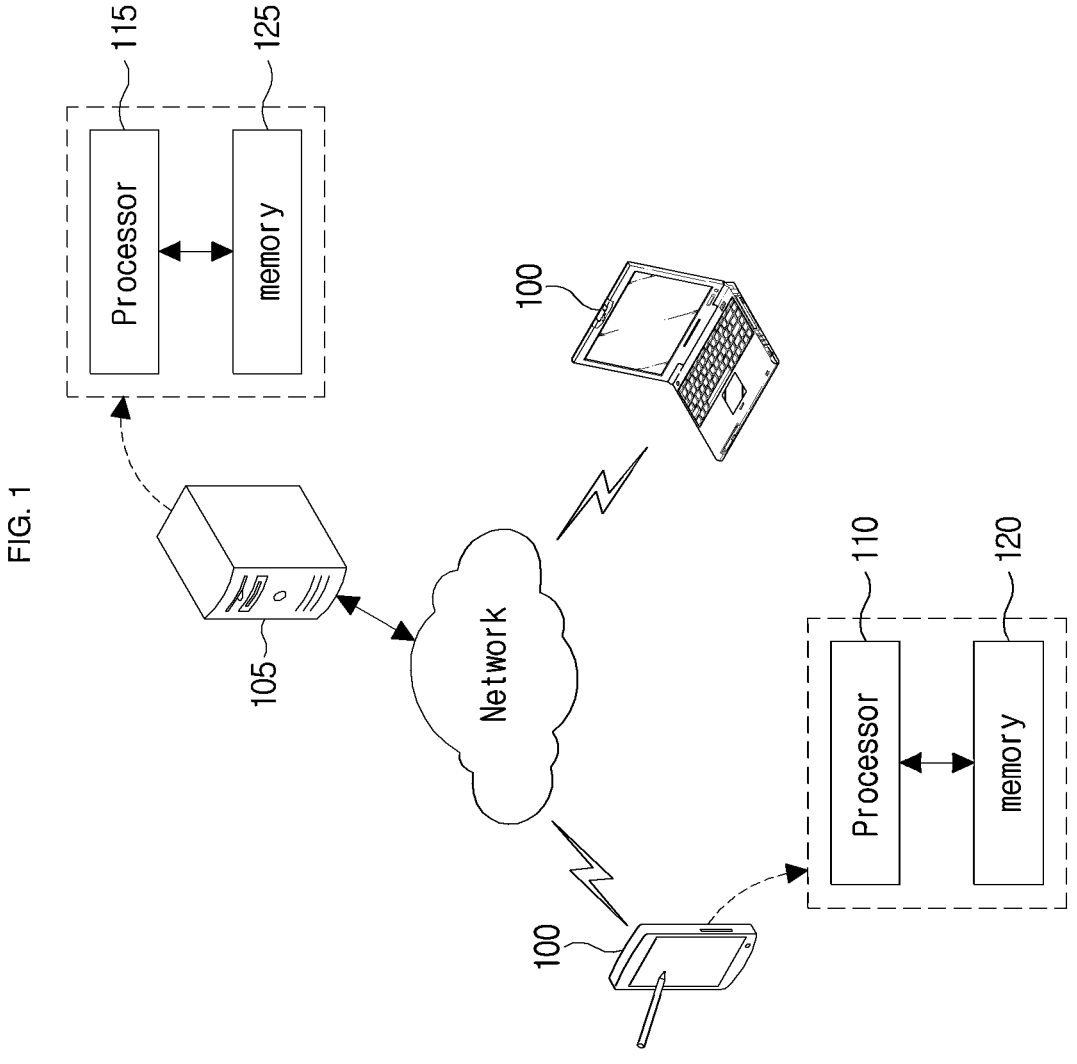
FIG. 1 is a conceptual diagram illustrating an image encoding and decoding system according to an embodiment of the present disclosure.

In a method and apparatus for image encoding/decoding according to the present disclosure, a candidate group of partition types available to a current block may be configured, a partition type of the current block into subblocks may be determined based on the candidate group and a candidate index, an intra-prediction mode may be derived in units of the current block, and the current block may be intra-predicted based on the intra-prediction mode and subblock partition type of the current block.

Mode for Invention

The present disclosure may be subject to various modifications and have various embodiments. Specific embodiments of the present disclosure will be described with reference to the accompanying drawings. However, the embodiments are not intended to limit the technical scope of the present disclosure, and it is to be understood that the present disclosure covers various modifications, equivalents, and alternatives within the scope and idea of the present disclosure.

The terms as used in the disclosure, first, second, A, and B may be used to describe various components, not limiting the components. These expressions are used only to distinguish one component from another component. For example, a first component may be referred to as a second component and vice versa without departing from the scope of the present disclosure. The term and/or covers a combination of a plurality of related items or any one of the plurality of related items.

When it is said that a component is "connected to" or "coupled with/to" another component, it should be understood that the one component is connected to the other component directly or through any other component. On the other hand, when it is said that a component is "directly connected to" or "directly coupled to" another component, it should be understood that there is no other component between the components.

The terms as used in the present disclosure are provided to describe merely specific embodiments, not intended to limit the present disclosure. Singular forms include plural referents unless the context clearly dictates otherwise. In the present disclosure, the term "include" or "have" signifies the presence of a feature, a number, a step, an operation, a component, a part, or a combination thereof, not excluding the presence or addition of one or more other features, numbers, steps, operations, components, parts, or a combination thereof.

Unless otherwise defined, the terms including technical or scientific terms used in the disclosure may have the same meanings as generally understood by those skilled in the art. The terms as generally defined in dictionaries may be interpreted as having the same or similar meanings as or to contextual meanings of related technology. Unless otherwise defined, the terms should not be interpreted as ideally or excessively formal meanings.

Typically, an image may include one or more color spaces according to its color format. The image may include one or more pictures of the same size or different sizes. For example, the YCbCr color configuration may support color formats such as 4:4:4, 4:2:2, 4:2:0, and monochrome (composed of only Y). For example, YCbCr 4:2:0 may be composed of one luma component (Y in this example) and two chroma components (Cb and Cr in this example). In this case, the configuration ratio of the chroma component and the luma component may have 1:2 width-height. For example, in case of 4:4:4, it may have the same configuration ratio in width and height. When a picture includes one or more color spaces as in the above example, the picture may be divided into the color spaces.

Images may be classified into I, P, and B according to their image types (e.g., picture, slice, tile, and so on). An I-picture may be an image which is encoded/decoded without a reference picture. A P-picture may be an image which is encoded/decoded using a reference picture, allowing only forward prediction. A B-picture may be an image which is encoded/decoded using a reference picture, allowing bi-directional prediction. However, some (P and B) of the types may be combined or an image type of a different composition may be supported, according to an encoding/decoding configuration.

Various pieces of encoding/decoding information generated in the present disclosure may be processed explicitly or implicitly. Explicit processing may be understood as a process of generating selection information indicating one candidate in a candidate group of a plurality of candidates related to coding information in a sequence, a slice, a tile, a block, or a subblock, and including the selection information in a bitstream by an encoder, and reconstructing related information as decoded information by parsing the related information at the same unit level as in the encoder by a decoder. Implicit processing may be understood as processing encoded/decoded information in the same process, rule, or the like at both the encoder and the decoder.

FIG. 1 is a conceptual diagram illustrating an image encoding and decoding system according to an embodiment of the present disclosure.

Referring to FIG. 1, each of an image encoding apparatus 105 and an image decoding apparatus 100 may be a user terminal such as a personal computer (PC), a laptop computer, a personal digital assistant (PDA), a portable multimedia player (PMP), a playstation portable (PSP), a wireless communication terminal, a smartphone, or a television (TV), or a server terminal such as an application server or a service server. Each of the image encoding apparatus 105 and the image decoding apparatus 100 may be any of various devices each including a communication device such as a communication modem, which communicates with various devices or a wired/wireless communication network, a memory 120 or 125 which stores various programs and data for inter-prediction or intra-prediction to encode or decode an image, or a processor 110 or 115 which performs computations and control operations by executing programs.

Further, the image encoding apparatus 105 may transmit an image encoded to a bitstream to the image decoding apparatus 100 in real time or non-real time through a wired/wireless communication network such as the Internet, a short-range wireless communication network, a wireless local area network (WLAN), a wireless broadband (Wi-Bro) network, or a mobile communication network or via various communication interfaces such as a cable or a universal serial bus (USB), and the image decoding apparatus 100 may reconstruct the received bitstream to an image by decoding the bitstream, and reproduce the image. Further, the image encoding apparatus 105 may transmit the image encoded to the bitstream to the image decoding apparatus 100 through a non-transitory computer-readable recording medium.

While the above-described image encoding apparatus and image decoding apparatus may be separate apparatuses, they may be incorporated into a single image encoding/decoding apparatus depending on implementation. In this case, some components of the image encoding apparatus may be substantially identical to their counterparts of the image decoding apparatus. Therefore, these components may be configured to include the same structures or execute at least the same functions.

Therefore a redundant description of corresponding technical component will be avoided in the following detailed description of the technical component and their operational principles. Further, since the image decoding apparatus is a computing device that applies an image encoding method performed in the image encoding apparatus to decoding, the following description will focus on the image encoding apparatus.

The computing device may include a memory storing a program or software module that performs an image encoding method and/or an image decoding method, and a processor connected to the memory and executing the program. The image encoding apparatus may be referred to as an encoder, and the image decoding apparatus may be referred to as a decoder.

Figure 2:
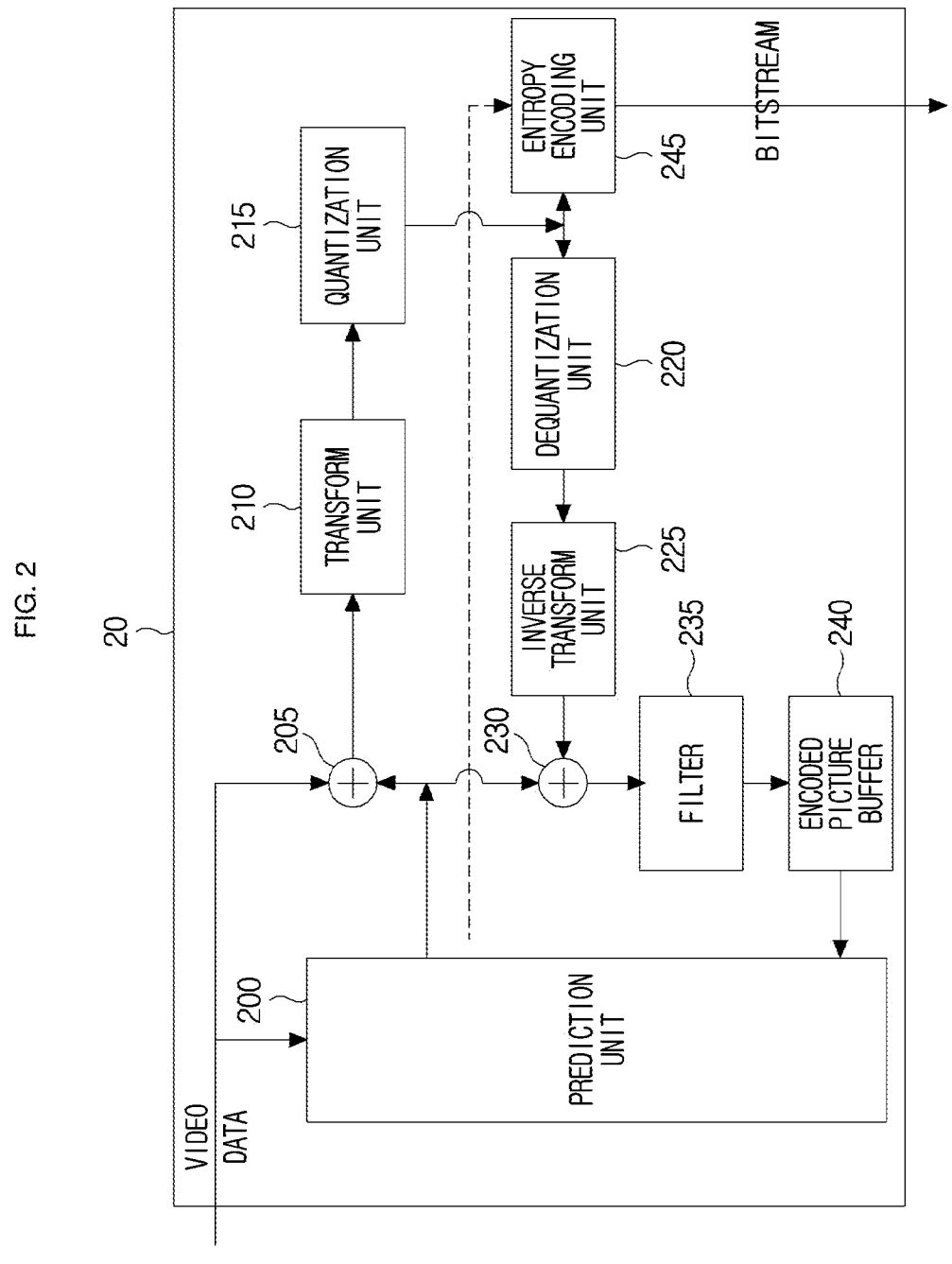
FIG. 2 is a block diagram illustrating an image encoding apparatus according to an embodiment of the present disclosure.

FIG. 2 is a block diagram illustrating an image encoding apparatus according to an embodiment of the present disclosure.

Referring to FIG. 2, an image encoding apparatus 20 may include a prediction unit 200, a subtraction unit 205, a transform unit 210, a quantization unit 215, a dequantization unit 220, an inverse transform unit 225, an add unit 230, a filter unit 235, an encoded picture buffer 240, and an entropy encoding unit 245.

The prediction unit 200 may be implemented using a prediction module which is a software module, and generate a prediction block for a block to be encoded by intra-prediction or inter-prediction. The prediction unit 200 may generate a prediction block by predicting a current block to be encoded in an image. In other words, the prediction unit 200 may generate a prediction block having a predicted pixel value of each pixel by predicting the pixel value of the pixel in the current block according to inter-prediction or intra-prediction. Further, the prediction unit 200 may provide information required for generating the prediction block, such as information about a prediction mode like an intra-prediction mode or an inter-prediction mode to an encoding unit so that the encoding unit may encode the information about the prediction mode. A processing unit subjected to prediction, a prediction method, and specific details about the processing unit may be configured according to an encoding/decoding configuration. For example, the prediction method and the prediction mode may be determined on a prediction unit basis, and prediction may be performed on a transform unit basis.

An inter-prediction unit may distinguish a translational motion model and a non-translational motion model from each other according to a motion prediction method. For the translational motion model, prediction is performed only in consideration of parallel translation, whereas for the non-translational motion model, prediction may be performed in consideration of a motion such as rotation, perspective, and zoom-in/zoom-out in additional to parallel translation. On the assumption of uni-directional prediction, the translational motion model may require one motion vector, whereas the non-translational motion model may require one or more motion vectors. In the case of the non-translation motion model, each motion vector may be information applied to preset positions in a current block, such as the top-left vertex and top-right vertex of the current block, and the position of a region to be predicted in the current block may be obtained at the pixel level or the subblock level based on a corresponding motion vector. The inter-prediction unit may apply a part of the following process commonly and another part of the following process individually according to the motion model.

The inter-prediction unit may include a reference picture configuration unit, a motion estimation unit, a motion compensator, a motion information decision unit, and a motion information encoder. The reference picture configuration unit may include an encoded picture previous to or next to a current picture in a reference picture list L0 or L1. A prediction block may be obtained from the reference picture included in the reference picture list, and a current image may also be configured as a reference picture and included in at least one reference picture list according to an encoding configuration.

The reference picture configuration unit of the inter-prediction unit may include a reference picture interpolator. The reference picture interpolator may perform interpolation for a fractional pixel according to an interpolation precision. For example, a 8-tap discrete cosine transform (DCT)-based interpolation filter may be applied to a luma component, and a 4-tap DCT-based interpolation filter may be applied to a chroma component.

The motion estimation unit of the inter-prediction unit may detect a block having a high correlation with the current block, using a reference picture. For this purpose, various methods such as full search-based block matching algorithm (FBMA), a three step search (TSS), and so on may be used. The motion compensator may obtain a prediction block in a motion estimation process.

The motion information decision unit of the inter-prediction unit may perform a process of selecting best motion information for the current block. The motion information may be encoded in a motion information encoding mode such as a skip mode, a merge mode, and a competition mode. The motion information encoding mode may be configured by combining supported modes according to a motion model. Such examples may include a (translational) skip mode, a (non-translational) skip mode, a (translational) merge mode, a (non-translational) merge mode, a (translational) competition mode, and a (non-translational) competition mode. Depending on an encoding configuration, a part of the modes may be included in a candidate group.

In the motion information encoding mode, a prediction value of motion information (a motion vector, a reference picture, a prediction direction, and so on) about a current block may be obtained from at least one candidate block. When two or more candidate blocks are supported, best candidate selection information may be generated. The prediction value may be used without any processing as the motion information about the current block in the skip mode (without a residual signal) and the merge mode (with a residual signal), whereas difference information between the motion information about the current block and the prediction value may be generated in the competition mode.

A candidate group for the prediction value of the motion information about the current block may be configured adaptively in various manners according to the motion information encoding mode. Motion information about blocks spatially neighboring to the current block (e.g., the left, top, top-left, top-right, and bottom-left blocks, and so on) may be included in the candidate group, motion information about blocks temporally neighboring to the current block may be included in the candidate group, and mixed motion information about spatial candidates and temporal candidates may be included in the candidate group.

The temporal neighbor blocks may include blocks in other pictures, corresponding to (matching) the current block, and may refer to the left, right, top, bottom, top-left, top-right, bottom-left, and bottom-right blocks of the blocks. The mixed motion information may refer to information obtained as the mean value, the media value, or the like of motion information about a spatial neighbor block and motion information about a temporal neighbor block.

Motion information may be prioritized to configure a motion information prediction value candidate group. The order of motion information to be included in the prediction value candidate group may be set according to the priorities. When as many pieces of motion information as the number of candidates in the candidate group (determined according to a motion information encoding mode) are filled in the candidate group according to the priorities, the candidate group may be completely configured. The motion information may be prioritized in the order of motion information about a spatial neighbor block, motion information about a temporal neighbor block, and mixed motion information about spatial and temporal neighbor blocks. However, the prioritization may also be modified.

For example, motion information about spatial neighbor blocks may be included in the candidate group in the order of left, top, top-right, bottom-left, and top-left blocks, and motion information about temporal neighbor blocks may be included in the candidate group in the order of bottom-right, center, right, and bottom blocks.

The subtraction unit 205 may generate a residual block by subtracting the prediction block from the current block. In other words, the subtraction unit 205 may calculate the difference between the pixel value of each pixel in the current block to be encoded and the predicted pixel value of a corresponding pixel in the prediction block generated by the prediction unit to generate a residual signal in the form of a block, that is, the residual block. Further, the subtraction unit 205 may generate a residual block in a unit other than a block obtained through the later-described block splitter.

The transform unit 210 may transform a spatial signal to a frequency signal. The signal obtained by the transform process is referred to as transform coefficients. For example, the residual block with the residual signal received from the subtraction unit may be transformed to a transform block with transform coefficients, and the input signal is determined according to an encoding configuration, not limited to the residual signal.

The transform unit may transform the residual block by, but not limited to, a transform scheme such as Hadamard transform, discrete sine transform (DST)-based transform, or DCT-based transform. These transform schemes may be changed and modified in various manners.

At least one of the transform schemes may be supported, and at least one sub-transform scheme of each transform scheme may be supported. The sub-transform scheme may be obtained by modifying a part of a base vector in the transform scheme.

For example, in the case of DCT, one or more of sub-transform schemes DCT-1 to DCT-8 may be supported, and in the case of DST, one or more of sub-transform schemes DST-1 to DST-8 may be supported. A transform scheme candidate group may be configured with a part of the sub-transform schemes. For example, DCT-2, DCT-8, and DST-7 may be grouped into a candidate group, for transformation.

Transformation may be performed in a horizontal/vertical direction. For example, one-dimensional transformation may be performed in the horizontal direction by DCT-2, and one-dimensional transformation may be performed in the vertical direction by DST-7. With the two-dimensional transformation, pixel values may be transformed from the spatial domain to the frequency domain.

One fixed transform scheme may be adopted or a transform scheme may be selected adaptively according to an encoding/decoding configuration. In the latter case, a transform scheme may be selected explicitly or implicitly. When a transform scheme is selected explicitly, information about a transform scheme or transform scheme set applied in each of the horizontal direction and the vertical direction may be generated, for example, at the block level. When a transform scheme is selected implicitly, an encoding configuration may be defined according to an image type (I/P/B), a color component, a block size, a block shape, an intra-prediction mode, and so on, and a predefined transform scheme may be selected according to the encoding configuration.

Further, some transformation may be skipped according to the encoding configuration. That is, one or more of the horizontal and vertical units may be omitted explicitly or implicitly.

Further, the transform unit may transmit information required for generating a transform block to the encoding unit so that the encoding unit encodes the information, includes the encoded information in a bitstream, and transmits the bitstream to the decoder. Thus, a decoding unit of the decoder may parse the information from the bitstream, for use in inverse transformation.

The quantization unit 215 may quantize an input signal. A signal obtained from the quantization are referred to as quantized coefficients. For example, the quantization unit 215 may obtain a quantized block with quantized coefficients by quantizing the residual block with residual transform coefficients received from the transform unit, and the input signal may be determined according to the encoding configuration, not limited to the residual transform coefficients.

The quantization unit may quantize the transformed residual block by, not limited to, a quantization scheme such as dead zone uniform boundary value quantization, a quantization weighted matrix, or the like. The above quantization schemes may be changed and modified in various manners.

The quantization may be skipped according to the encoding configuration. For example, the quantization (and dequantization) may be skipped according to the encoding configuration (e.g., a quantization parameter of 0, that is, a lossless compression environment). In another example, when quantization-based compression performance is not exerted in view of the characteristics of an image, the quantization process may be omitted. The quantization may be skipped in the whole or partial region (M/2×N/2, M×N/2, or M/2×N) of the quantization block (M×N), and quantization skip selection information may be set explicitly or implicitly.

The quantization unit may transmit information required for generating a quantized block to the encoding unit so that the encoding unit encodes the information, includes the encoded information on a bitstream, and transmits the bitstream to the decoder. Thus, the decoding unit of the decoder may parse the information from the bitstream, for use in dequantization.

While the above example has been described on the assumption that a residual block is transformed and quantized by the transform unit and the quantization unit, a residual block with transform coefficients may be generated by transforming a residual signal and may not be quantized. The residual block may be subjected only to quantization without transformation. Further, the residual block may be subjected to both transformation and quantization. These operations may be determined depending on the encoding configuration.

The dequantization unit 220 dequantizes the residual block quantized by the quantization unit 215. That is, the dequantization unit 220 generates a residual block with frequency coefficients by dequantizing a quantization frequency coefficient sequence.

The inverse transform unit 225 inversely transforms the residual block dequantized by the dequantization unit 220. That is, the inverse transform unit 225 inversely transforms the frequency coefficients of the dequantized residual block to generate a residual block with pixel values, that is, a reconstructed residual block. The inverse transform unit 225 may perform inverse transform by inversely performing the transform scheme used by the transform unit 210.

The add unit 230 reconstructs the current block by adding the prediction block predicted by the prediction unit 200 and the residual block recovered by the inverse transform unit 225. The reconstructed current block is stored as a reference picture (or reference block) in the coded picture buffer 240, for use as a reference picture when the next block to the current block, another block, or another picture are encoded later.

The filter unit 235 may include one or more post-processing filters such as a deblocking filter, a sample adaptive offset (SAO), and an adaptive loop filter (ALF). The deblocking filter may remove block distortion occurring at the boundary between blocks in a reconstructed picture. The ALF may perform filtering based on a value obtained by comparing the reconstructed image and the original image after the block is filtered through the deblocking filter. The SAO may reconstruct an offset difference at the pixel level between the original image and the residual block to which the deblocking filter is applied. These post-processing filters may be applied to a reconstructed picture or block.

The coded picture buffer 240 may store the block or picture reconstructed by the filter unit 235. The reconstructed block or picture stored in the coded picture buffer 240 may be provided to the prediction unit 200 that performs intra-prediction or inter-prediction.

The entropy encoding unit 245 scans the generated quantized frequency coefficient sequence in various scan methods to generate a quantized coefficient sequence, encodes the quantized coefficient sequence by entropy encoding, and outputs the entropy-encoded coefficient sequence. A scan pattern may be configured as one of various patterns such as zigzag, diagonal, and raster. Further, encoded data including encoding information received from each component may be generated and output in a bitstream.

Figure 3:
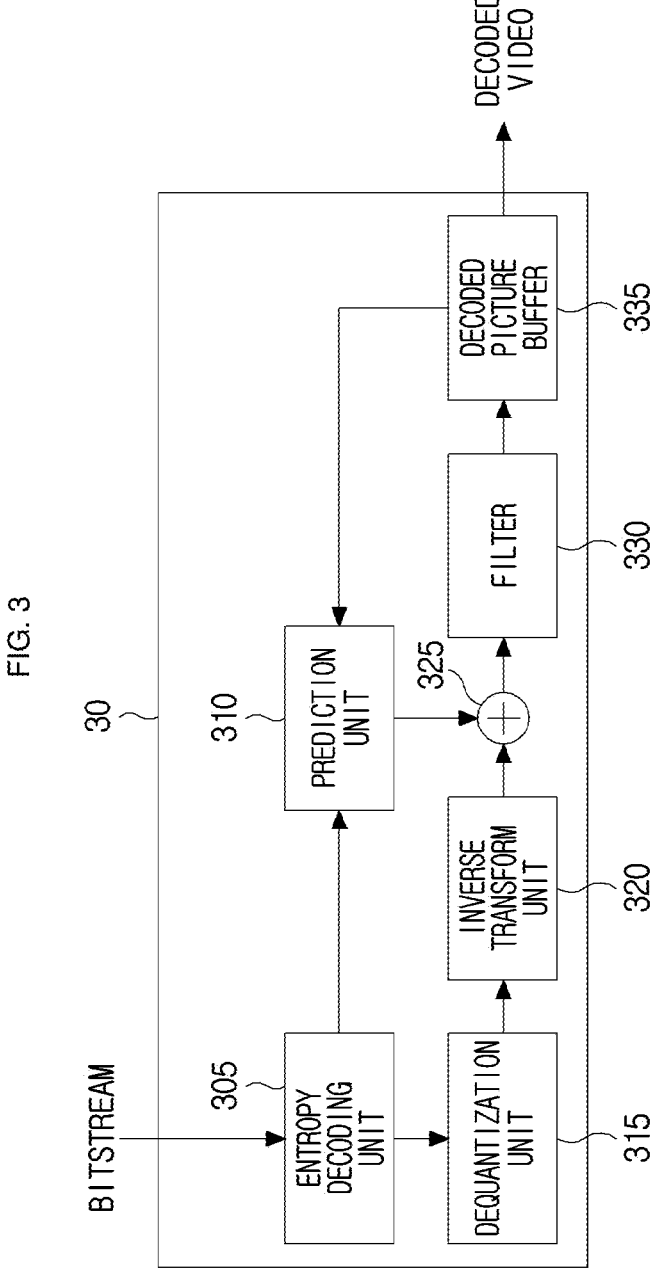
FIG. 3 is a block diagram illustrating an image decoding apparatus according to an embodiment of the present disclosure.

FIG. 3 is a block diagram illustrating an image decoding apparatus according to an embodiment of the present disclosure.

Referring to FIG. 3, an image decoding apparatus 30 may be configured to include an entropy decoder 305, a prediction unit 310, a dequantization unit 315, an inverse transform unit 320, an add unit/subtraction unit 325, a filter 330, and a decoded picture buffer 335.

Further, the prediction unit 310 may be configured to include an intra-prediction module and an inter-prediction module.

When an image bitstream is received from the image encoding apparatus 20, the image bitstream may be transmitted to the entropy decoder 305.

The entropy decoder 305 may decode the bitstream to decoded data including quantized coefficients and decoding information to be transmitted to each component.

The prediction unit 310 may generate a prediction block based on the data received from the entropy decoder 305. Based on a reference image stored in the decoded picture buffer 335, a reference picture list may be made using a default configuration scheme.

The inter-prediction unit may include a reference picture configuration unit, a motion compensator, and a motion information decoder. Some of the components may perform the same processes as in the encoder, and others may inversely perform processes of the encoder.

The dequantization unit 315 may dequantize quantized transform coefficients that are provided in the bitstream and decoded by the entropy decoder 305.

The inverse transform unit 320 may generate a residual block by applying inverse DCT, inverse integer transform, or a similar inverse transform technique to the transform coefficients.

The dequantization unit 315 and the inverse transform unit 320 may reversely perform the processes of the transform unit 210 and the quantization unit 215 of the image encoding apparatus 20 described above, and may be implemented in various ways. For example, the dequantization unit 315 and the inverse transform unit 320 may use the same processes and inverse transform shared with the transform unit 210 and the quantization unit 215, and may reversely perform transformation and quantization using information about the transformation and quantization processes received from the image encoding apparatus 20 (e.g., a transform size, a transform shape, a quantization type, and so on).

The residual block that has been dequantized and inversely transformed may be added to the prediction block derived by the prediction unit 310, thus producing a reconstructed image block. This addition may be performed by the add unit/subtraction unit 325.

Regarding the filter 330, a deblocking filter may be applied to remove a blocking phenomenon from the reconstructed image block, when needed. To improve a video quality before and after the decoding process, other loop filters may be additionally used.

The reconstructed and filtered image block may be stored in the decoded picture buffer 335.

While not shown in the drawings, the image encoding/decoding apparatus may further include a picture splitter and a block splitter.

The picture splitter may split (or divide) a picture into at least one processing unit such as a color space (e.g., YCbCr, RGB, or XYZ), a tile, a slice, or a basic coding unit (a maximum coding unit or a coding tree unit (CTU)), and the block splitter may split a basic coding unit into at least one processing unit (e.g., a coding unit, a prediction unit, a transform unit, a quantization unit, an entropy encoding unit, and an in-loop filtering unit).

Basic coding units may be obtained by splitting a picture at regular intervals in the horizontal direction and the vertical direction. In this manner, the picture may be split into, but not limited to, tiles, slices, and so on. Although a partition unit such as a tile or a slice may include an integer multiple of basic coding blocks, a partition unit located at an image edge may be exceptional. In this case, the size of a basic coding block may be adjusted.

For example, a picture may be divided into basic coding units and then split into the above units, or a picture may be divided into the above units and then split into basic coding units. The order of division and splitting into units is assumed to be the former in the present disclosure, which should not be construed as limiting the present disclosure. According to an encoding/decoding configuration, the latter case may also be possible. In the latter case, the size of the basic coding unit may be changed adaptively according to a partition unit (e.g., tile). That is, it means that a basic coding block having a different size may be supported in each partition unit.

In the present disclosure, the following description will be given with the appreciation that division of a picture into basic coding units is configured as a default setting. The default setting may mean that a picture is not divided into tiles or slices, or a picture is one tile or one slice. However, as described above, even when a picture is first divided into partition units (tiles, slices, or the like) and then split into basic coding units based on the partition units (i.e., when the number of each partition unit is not an integer multiple of basic coding units), it should be understood that various embodiments described below may be applied in the same manner or with some modification.

Among the partition units, a slice may be a group of at least one consecutive block according to a scan pattern, and a tile may be a rectangular group of spatially neighboring blocks. Other partition units may be supported and constructed according their definitions. A slice and a tile may be partition units supported for the purpose of parallelization. To this end, referencing between partition units may be limited (i.e., referencing is not allowed).

A slice may generate partitioning information for each unit using information about the starting positions of consecutive blocks, and in case of a tile, it may generate information about horizontal and vertical partitioning lines or generate position information of the tile (for example, top-left, top-right, bottom-left, and bottom-right position).

Each of a slice and a tile may be split into a plurality of units according to an encoding/decoding configuration.

For example, unit A may include configuration information that affects an encoding/decoding process (i.e., a tile header or a slice header), and unit B may not include configuration information. Alternatively, unit A may be a unit not allowed to reference another unit during encoding/decoding, and unit B may be a unit allowed to reference another unit. Further, unit A may include another unit b in a hierarchical relationship with unit B or may be a peer relationship with unit B.

Unit A and unit B may be a slice and a tile (or a tile and a slice), respectively. Alternatively, each of unit A and unit B may be a slice or a tile. For example, unit A may be slice/tile type 1, and unit B may be slice/tile type 2.

Each of type 1 and type 2 may be one slice or tile. Alternatively, type 1 may be a plurality of slices or tiles (a slice group or tile group) (including type 2), and type 2 may be one slice or tile.

As described above, the present disclosure is described on the assumption that a picture is composed of one slice or tile. However, if two or more partition units are generated, the above description may be applied to and understood in the embodiments described below. Further, unit A and unit B are examples with features that a partitioning unit may have, and an example of combining unit A and unit B in the respective examples is also possible.

The block splitter may obtain information about the basic coding unit from the picture splitter, and the basic coding unit may refer to a basic (or starting) unit for prediction, transformation, quantization, and so on in an image encoding/decoding process. In this case, the basic coding unit may be composed of one luma basic coding block (maximum coding block or CTB) and two basic chroma coding blocks according to a color format (YCbCr in this example), and the size of each block may be determined according to the color format. A coding block (CB) may be obtained according to the partitioning process. A CB may be understood as a unit which is not further sub-divided due to certain restrictions, and may be set as a starting unit for partitioning into sub-units. In the present disclosure, a block conceptually encompasses various shapes such as a triangle, a circle, and so on, not limited to a square. For the convenience of description, it is assumed that a block is rectangular.

While the following description is given in the context of one color component, it is also applicable to other color component with some modification, in proportion to a ratio according to the color format (for example, in case of YCbCr 4:2:0, the width-height length ratio of the luma component and the chroma component is 2:1). Further, although block partitioning dependent on other color component (e.g. depending on the block partitioning result of Y in Cb/Cr) is possible, it should be understood that block independent partitioning of each color component is also possible. Further, although one common block partitioning configuration (in consideration of being proportional to a length ratio) may be used, it is also necessary to consider and understand that an individual block partitioning configuration is used according to a color component.

In the block splitter, a block may be expressed as M×N, and the maximum and minimum values of each block may be obtained within the range. For example, if the maximum and minimum values of a block are 256×256 and 4×4, respectively, a block of size $2^m \times 2^n$ (m and n are integers of 2 to 8 in this example), a block of size $2^m \times 2^n$ (m and n are integers of 2 to 128 in this example), or a block of size m×m (m and n are integers of 4 to 256 in this example) may be obtained. Herein, m and n may be equal or different, and one or more ranges in which blocks are supported, such as the maximum value and the minimum value, may be generated.

For example, information about the maximum size and minimum size of a block may be generated, and information about the maximum size and minimum size of a block may be generated in some partitioning configuration. In the former case, the information may be range information about maximum and minimum sizes that may be produced in an image, whereas in the latter case, the information may be information about maximum and minimum sizes that may be produced according to some partitioning configuration. The partitioning configuration may be defined by an image type (I/P/B), a color component (YCbCr or the like), a block type (coding/prediction/transform/quantization), a partitioning type (index or type), and a partitioning scheme (quad tree (QT), binary tree (BT), and ternary tree (TT) as tree methods, and SI2, SI3, and SI4 as type methods).

Further, there may be a constraint on a width-height ratio available to a block (a block shape), and in this regard, a boundary value may be set. Only blocks less than or equal to/less than a boundary value k may be supported, where k may be defined according to a width-height ratio, A/B (A is the longer or equal value between the width and height, and B is the other value). k may be a real number equal to or larger than 1, such as 1.5, 2, 3, 4, or the like. As in the above example, a constraint on the shape of one block in an image may be supported, or one or more constrains may be supported according to a partitioning configuration.

In summary, it may be determined whether block partitioning is supported based on the above-described range and constraint and a later-described partitioning configuration. For example, when a candidate (child block) split from a block (parent block) is satisfying a supported block condition, the partitioning may be supported, and otherwise, the partitioning may not be supported.

The block splitter may be configured in relation to each component of the image encoding apparatus and the image decoding apparatus, and the size and shape of a block may be determined in this process. Different blocks may be configured according to components. The blocks may include a prediction block for the prediction unit, a transform block for the transform unit, and a quantization block for the quantization unit. However, the present disclosure is not limited thereto, and block units may be additionally defined for other components. While the shape of each of an input and an output is described as a square in each component in the present disclosure, the input and the output of some component may have any other shape (e.g., a triangle).

The size and shape of an initial (or starting) block in the block splitter may be determined from a higher unit. The initial block may be split into smaller blocks. Once an optimal size and shape are determined according to the block partitioning, the block may be determined as an initial block for a lower unit. The higher unit may be a coding block, and the lower unit may be a prediction block or a transform block, to which the present disclosure is not limited. Rather, various modification examples are possible. Once the initial block of the lower unit is determined as in the above example, a partitioning process may be performed to detect a block of an optimal size and shape like the higher unit.

In summary, the block splitter may split a basic coding block (or maximum coding block) into at least one coding block, and the coding block may be split into at least one prediction block/transform block/quantization block. Further, the prediction block may be split into at least one transform block/quantization block, and the transform block may be split into at least one quantization block. Some blocks may be in a dependent relationship with other blocks (i.e., defined by a higher unit and a lower unit) or may have an independent relationship with other blocks. For example, the prediction block may be a higher unit above the transform block or may be a unit independent of the transform block. Various relationships may be established according to the types of blocks.

Depending on an encoding/decoding configuration, whether to combine a higher unit and a lower unit may be determined. Combination between units means that a block of a higher unit is subjected to an encoding/decoding process of a lower unit (e.g., in the prediction unit, transform unit, inverse transform unit, and so on), without being split into lower units. That is, it may mean that a partitioning process is shared between a plurality of units, and partitioning information is generated in one (e.g., a higher unit) of the units.

For example, (when a coding block is combined with a prediction block or a transform block), the coding block may be subjected to prediction, transformation, and inverse transformation.

For example, (when a coding block is combined with a prediction block), the coding block may be subjected to prediction, and a transform block equal to or smaller than the coding block in size may be subjected to transformation and inverse transformation.

For example, (when a coding block is combined with a transform block), a prediction block equal to or smaller than the coding block in size may be subjected to prediction, and the coding block may be subjected to transformation and inverse transformation.

For example, (when a prediction block is combined with a transform block), a prediction block equal to or smaller than the coding block in size may be subjected to prediction, transformation, and inverse transformation.

For example, (when there is no block combining), a prediction block equal to or smaller than a coding block in size may be subjected to prediction, and a transform block equal to or smaller than the coding block in size may be subjected to transformation and inverse transformation.

While various cases of a coding block, a prediction block, and a transform block have been described in the above examples, the present disclosure is not limited thereto.

For combination between units, a fixed configuration may be supported in an image, or an adaptive configuration may be supported in consideration of various encoding/decoding factors. The encoding/decoding factors include an image type, a color component, a coding mode (Intra/Inter), a partitioning configuration, a block size/shape/position, a width-height ratio, prediction-related information (e.g., intra-prediction mode, inter-prediction mode, or the like), transformation-related information (e.g., transformation scheme selection information or the like), quantization-related information (e.g., quantization region selection information and quantized transform coefficient coding information), and so on.

When a block of an optimal size and shape has been detected as described above, mode information (e.g., partitioning information) for the block may be generated. The mode information may be included in a bitstream along with information generated from a component to which the block belongs (e.g., prediction-related information and transformation-related information) and transmitted to the decoder, and may be parsed at the same unit level by the decoder, for use in a video decoding process.

Now, a partitioning scheme will be described. While it is assumed that an initial block is shaped into a square, for the convenience of description, the present disclosure is not limited thereto, and the description is applicable in the same manner or a similar manner to a case in which the initial block is rectangular.

The block splitter may support various types of partitioning. For example, tree-based partitioning or index-based partitioning may be supported, and other methods may also be supported. In tree-based partitioning, a partition type may be determined based on various types of information (e.g., information indicating whether partitioning is performed, a tree type, a partitioning direction, and so on), whereas in index-based partitioning, a partitioning type may be determined using specific index information.

Figure 4:
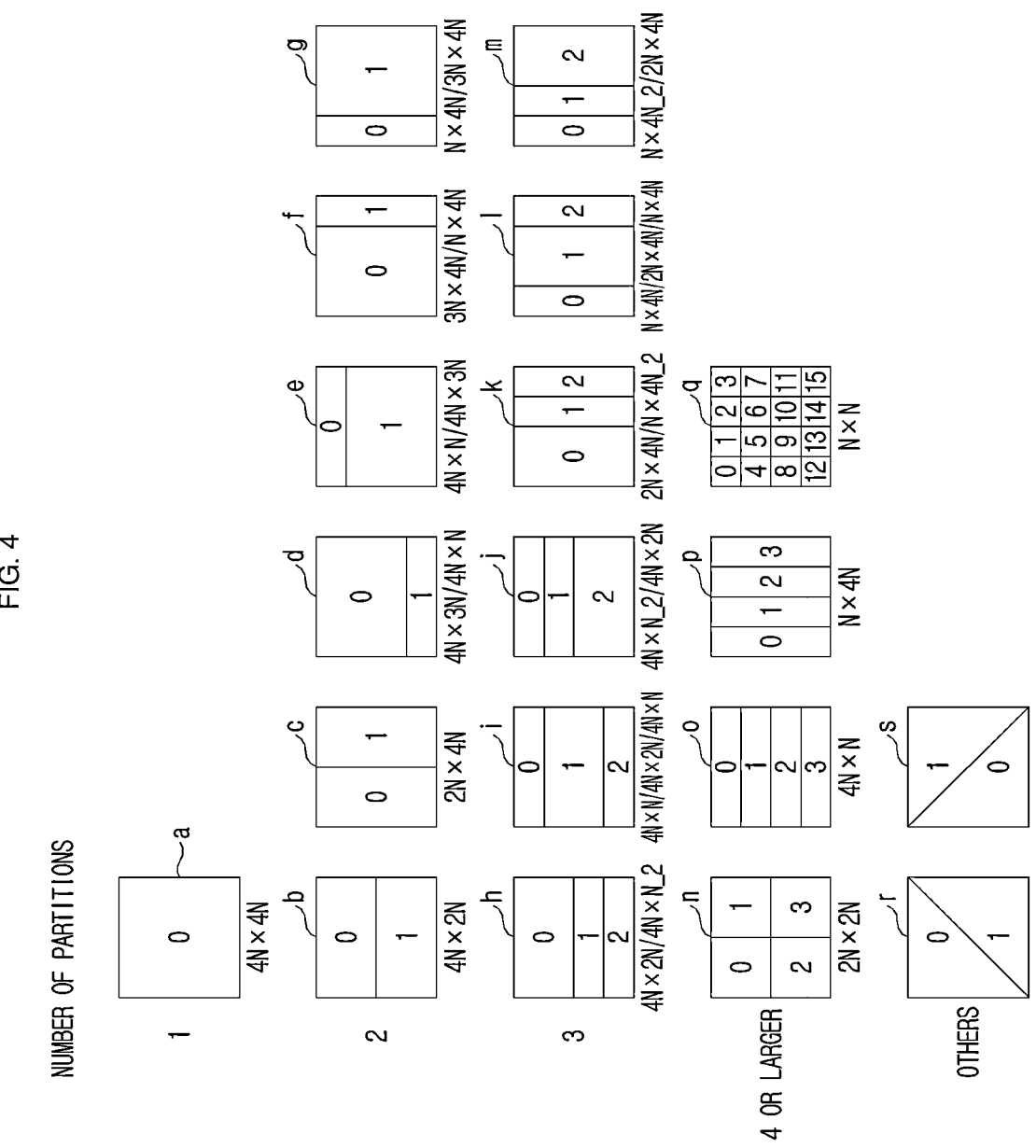
FIG. 4 is an exemplary diagram illustrating various partition types which may be obtained in a block splitter of the present disclosure.

FIG. 4 is an exemplary diagram illustrating various partition types which may be obtained in a block splitter of the present disclosure. In this example, it is assumed that the partitioning types illustrated in FIG. 4 are obtained by one partitioning operation (or process), which should not be construed as limiting the present disclosure. The partition types may also be obtained in a plurality of partitioning operations. Further, an additional partition type which is not illustrated in FIG. 4 may also be available.

(Tree-Based Partitioning)

In tree-based partitioning of the present disclosure, QT, BT, and TT may be supported. If one tree method is supported, this may be referred to as single-tree partitioning, and if two or more tree methods are supported, this may be referred to as multi-tree partitioning.

In QT, a block is split into two partitions in each of the horizontal and vertical directions (n), whereas in BT, a block is split into two partitions in either the horizontal direction or the vertical direction (b to g). In TT, a block is split into three partitions in either the horizontal direction or the vertical direction (h to m).

In QT, a block may be split into four partitions by limiting the partitioning direction to one of the horizontal and vertical directions (o and p). Further, in BT, only split of a block into equal-sized partitions (b and c), only split of a block into partitions of different sizes (d to g), or both of the partition types may be supported. Further, in TT, split of a block into partitions concentrated only in a specific direction (1:1:2 or 2:1:1 in the direction of left→right or top→bottom) (h, j, k, and m), split of a block into partitions concentrated at the center (1:2:1) (i and I), or both the partition types may be supported. Further, split of a block into four partitions in each of the horizontal and vertical directions (i.e., a total of 16 partitions) may be supported (q).

Among the tree methods, split of a block into z partitions only in the horizontal direction (b, d, e, h, i, j, o), split of a block into z partitions only in the vertical direction (c, f, g, k, l, m, p), or both the partition types may be supported. Herein, z may be an integer equal to or greater than 2, such as 2, 3, or 4.

In the present disclosure, it is assumed that the partition type n is supported as QT, the partition types b and c are supported as BT, and partition types i and I are supported as TT.

One or more of the tree partitioning schemes may be supported according to an encoding/decoding configuration. For example, QT, QT/BT, or QT/BT/TT may be supported.

In the above example, the basic tree partitioning scheme is QT, and BT and TT are included as additional partitioning schemes depending on whether other trees are supported. However, various modifications may be made. Information indicating whether other trees are supported (bt_enabled_flag, tt_enabled_flag, and bt_tt_enabled_flag, with 0 indicating not support and 1 indicating support) may be implicitly determined according to an encoding/decoding setting or explicitly determined in units such as sequence, picture, slice, or tile.

Partitioning information may include information indicating whether partitioning is performed (tree_part_flag or qt_part_flag, bt_part_flag, tt_part_flag, and bt_tt_part_flag, which may have a value of 0 or 1 with 0 indicating not partition and 1 indicating partition). Further, depending on partitioning schemes (BT and TT), information about a partitioning direction (dir_part_flag, or bt_di_part_flag, tt_dir_part_flag, and bt_tt_dir_part_flag, which have a value of 0 or 1 with 0 indicating <width/horizontal> and 1 indicating <height/vertical>) may be added. This may be information that may be generated when partitioning is performed.

When multi-tree partitioning is supported, various pieces of partitioning information may be configured. The following description is given of an example of how partitioning information is configured at one depth level (that is, although recursive partitioning is possible by setting one or more supported partitioning depths), for the convenience of description.

In Example 1, information indicating whether partitioning is performed is checked. If partitioning is not performed, the partitioning ends.

If partitioning is performed, selection information about a partition type (e.g., tree_idx. 0 for QT, 1 for BT, and 2 for TT) is checked. Partitioning direction information is additionally checked according to the selected partition type, and the procedure proceeds to the next step (if additional partitioning is possible for reasons such as when a partitioning depth has not reached a maximum value, the procedure starts again from the beginning, and if the additional partitioning is not possible, the partitioning procedure ends).

In Example 2, information indicating whether partitioning is performed in a certain tree scheme (QT) is checked and the procedure proceeds to the next step. If partitioning is not performed in the tree scheme (QT), information indicating whether partitioning is performed in another tree scheme (BT) is checked. In this case, if partitioning is not performed in the tree scheme, information indicating whether partitioning is performed in a third tree scheme (TT) is checked. If partitioning is not performed in the third tree scheme (TT), the partitioning procedure ends.

If partitioning is performed in the tree scheme (QT), the procedure proceeds to the next step. Further, partitioning is performed in the second tree scheme (BT), partitioning direction information is checked and the procedure proceeds to the next step. If partitioning is performed in the third tree scheme (TT), partitioning direction information is checked and the procedure proceeds to the next step.

In Example 3, information indicating whether partitioning is performed in a tree scheme (QT) is checked. If partitioning is not performed in the tree scheme (QT), information indicating whether partitioning is performed in other tree schemes (BT and TT) is checked. If partitioning is not performed, the partitioning procedure ends.

If partitioning is performed in the tree scheme (QT), the procedure proceeds to the next step. Further, partitioning is performed in the other tree schemes (BT and TT), partitioning direction information is checked and the procedure proceeds to the next step.

While tree partitioning schemes are prioritized (Example 2 and Example 3) or no priorities are assigned to the tree partitioning schemes (Example 1) in the above examples, various modification examples may also be available. Further, partitioning in a current step is not related to the partitioning result of the previous step in the above example. However, it is also possible to configure partitioning in the current step to be dependent on the partitioning result of the previous step.

In Example 1 to Example 3, if some tree partitioning scheme (QT) is performed in the previous step and thus the procedure proceeds to the current step, the same tree partitioning scheme (QT) may be supported in the current step, as well.

On the other hand, if the certain tree partitioning scheme (QT) was not performed and thus another tree partitioning scheme (BT or TT) was performed in the previous step, and then the procedure proceeds to the current step, it may be configured that the other tree partitioning schemes (BT and TT) except for the certain tree partitioning scheme (QT) are supported in the current step and the following steps.

In the above case, a tree configuration supported for block partitioning may be adaptive, and thus the afore-mentioned partitioning information may also be configured differently. (The example to be described later is assumed to be Example 3). That is, if partitioning is not performed in the certain tree scheme (QT) in the previous step, the partitioning procedure may be performed with no regard to the tree scheme (QT) in the current step. In addition, partitioning information related to the certain tree scheme (e.g., information indicating whether partitioning is performed, information about a partitioning direction, and so on. In this example <QT>, information indicating whether partitioning is performed) may be removed.

The above example relates to an adaptive partitioning information configuration for the case where block partitioning is allowed (e.g., a block size is within a range between maximum and minimum values, the partitioning depth of each tree scheme has not reached a maximum depth (allowed depth), or the like). Even when block partitioning is restricted (e.g., the block size does not exist in the range between the maximum and minimum values, the partitioning depth of each tree scheme has reached the maximum depth, or the like), partitioning information may be configured adaptively.

As already mentioned, tree-based partitioning may be performed in a recursive manner in the present disclosure. For example, if a partition flag of a coding block with a partitioning depth of k is set to 0, coding block encoding is performed in the coding block with the partitioning depth of k. If the partition flag of the coding block with the partitioning depth of k is set to 1, coding block encoding is performed in N sub-coding blocks with a partitioning depth of k+1 according to a partitioning scheme (where N is an integer equal to or greater than 2, such as 2, 3, and 4).

The sub-coding block may be set as a coding block (k+1) and partitioned into sub-coding blocks (k+2) in the above procedure. This hierarchical partitioning scheme may be determined according to a partitioning configuration such as a partitioning range and an allowed partitioning depth.

In this case, a bitstream structure representing partitioning information may be selected from among one or more scan methods. For example, the bitstream of the partitioning information may be configured based on an order of partitioning depths, or based on whether partitioning is performed.

For example, in the partitioning depth order-based case, partitioning information is obtained at a current depth level based on an initial block, and then partitioning information is obtained at the next depth level. In the case based on whether partitioning is performed, additional partitioning information is first obtained in a block split from an initial block, and other additional scan methods may be considered.

(Index-Based Partitioning)

In index-based partitioning of the present disclosure, a constant split index (CSI) scheme and a variable split index (VSI) scheme may be supported.

In the CSI scheme, k subblocks may be obtained through partitioning in a predetermined direction, and k may be an integer equal to or greater than 2, such as 2, 3, or 4. Specifically, the size and shape of a subblock may be determined based on k irrespective of the size and shape of a block. The predetermined direction may be one of or a combination of two or more of horizontal, vertical, and diagonal directions (top-left→bottom-right direction or bottom-left→top-right direction).

In the index-based CSI partitioning scheme of the present disclosure, z candidates may be obtained through partitioning in either the horizontal direction or the vertical direction. In this case, z may be an integer equal to or greater than 2, such as 2, 3, or 4, and the subblocks may be equal in one of width and height and may be equal or different in the other one of width and height. The width or height length ratio of the subblocks are $A_1:A_2: \ldots :A_z$, and each of $A_1$ to $A_z$ may be an integer equal to or greater than 1, such as 1, 2, or 3.

Further, a candidate may be obtained by partitioning into x partitions and y partitions along the horizontal and vertical directions, respectively. Each of x and y may be an integer equal to or greater than 1, such as 1, 2, 3, or 4. However, a candidate with both x and y being 1s may be restricted (because a already exists). Although FIG. 4 illustrates cases where subblocks have the same width or height ratio, candidates having the different width ratio or height ratio may also be included.

Further, a candidate may be split into w partitions in one of diagonal directions, top-left→bottom-right and bottom-left→top-right. Herein, w may be an integer equal to or greater than 2, such as 2 or 3.

Referring to FIG. 4, partition types may be classified into a symmetrical partition type (b) and an asymmetric partition type (d and e) according to a length ratio of each subblock. Further, partition types may be classified into a partition type concentrated in a specific direction (k and m) and a centered partitioning type (k). Partition types may be defined by various encoding/decoding factors including a subblock shape as well as a subblock length ratio, and a supported partition type may be implicitly or explicitly determined according to an encoding/decoding configuration. Thus, a candidate group may be determined based on the supported partition type in the index-based partitioning scheme.

In the VSI scheme, with the width w or height h of each subblock fixed, one or more subblocks may be obtained through partitioning in a predetermined direction. Herein, each of w and h may be an integer equal to or greater than 1, such as 1, 2, 4, or 8. Specifically, the number of subblocks may be determined based on the size and shape of a block, and the w or h value.

In the index-based VSI partitioning scheme of the present disclosure, a candidate may be partitioned into subblocks, each being fixed in one of the width and length. Alternatively, a candidate may be partitioned into subblocks, each being fixed in both the width and length. Since the width or height of a subblock is fixed, equal partitioning in the horizontal or vertical direction may be allowed. However, the present disclosure is not limited thereto.

In the case where a block is of size M×N prior to partitioning, if the width w of each subblock is fixed, the height h of each subblock is fixed, or both of the width w and height h of each subblock are fixed, the number of obtained subblocks may be (M*N)/w, (M*N)/h, or (M*N)/w/h.

Depending on an encoding/decoding configuration, only one or both of the CSI scheme and the VSI scheme may be supported, and information about a supported scheme may be implicitly or explicitly determined.

The present disclosure will be described in the context of the CSI scheme being supported.

A candidate group may be configured to include two or more candidates in the index-based partitioning scheme according to an encoding/decoding setting.

For example, a candidate group such as {a, b, c}, {a, b, c, n}, or {a to g and n} may be formed. The candidate group may be an example of including block types predicted to occur many times based on general statistical characteristics, such as a block divided into two partitions in the horizontal or vertical direction or in each of the horizontal and vertical directions.

Alternatively, a candidate group such as {a, b}, {a, o}, or {a, b, o}, or a candidate group such as {a, c}, {a, p}, or {a, c, p} may be configured. The candidate group may be an example of including candidates each being partitioned into partitions and four partitions in the horizontal and vertical directions, respectively. This may be an example of configuring block types predicted to be partitioned mainly in a specific direction as a candidate group.

Alternatively, a candidate group such as {a, o, p} or {a, n, q} may be configured. This may be an example of configuring a candidate group to include block types predicted to be partitioned into many partitions smaller than a block prior to partitioning.

Alternatively, a candidate group such as {a, r, s} may be configured, and it may be an example of determining that the optimal partitions result that can be obtained in a rectangular shape through other method (tree method) from the block before being split, and configuring the non-rectangular shape as a candidate group.

As noted from the above examples, various candidate group configurations may be available, and one or more candidate group configurations may be supported in consideration of various encoding/decoding factors.

Once a candidate group is completely configured, various partitioning information configurations may be available.

For example, regarding a candidate group including the candidate a which is not partitioned and the candidates b to s which are partitioned, index selection information may be generated.

Alternatively, information indicating whether partitioning is performed (information indicating whether the partitioning type is a) may be generated. If partitioning is performed (if the partitioning type is not a), index selection information may be generated regarding a candidate group including the candidates b to s that are partitioned.

The partitioning information may be configured in many other ways than described above. Except for the information indicating whether partitioning is performed, binary bits may be assigned to the index of each candidate in the candidate group in various manners such as fixed length binarization, variable length binarization, and so on. If the number of the candidate is 2, 1 bit may be assigned to the index selection information, and if the number of the candidates is 3, one or more bits may be assigned to the index selection information.

Compared to the tree-based partitioning scheme, partition types predicted to occur many times may be included in a candidate group in the index-based partitioning scheme.

Since the number of bits used to represent index information may increase according to the number of supported candidate groups, this scheme may be suitable for single-layer partitioning (e.g., the partitioning depth is limited to 0), instead of tree-based hierarchical partitioning (recursive partitioning). That is, a single partitioning operation may be supported, and a subblock obtained through index-based partitioning may not be further split.

This may mean that further partitioning into smaller blocks of the same type is impossible (e.g., a coding block obtained through index-based partitioning may not be further split into coding blocks), and also mean that further partitioning into different types of blocks may also be impossible (e.g., partitioning of a coding block into prediction blocks as well as coding blocks is not possible). Obviously, the present disclosure is not limited to the above example, and other modification examples may also be available.

Now, a description will be given of determination of a block partitioning configuration mainly based on a block type among encoding/decoding factors.

First, a coding block may be obtained in a partitioning process. A tree-based partitioning scheme may be adopted for the partitioning process, and a partition type such as a (no split), n (QT), b, c (BT), i, or I (TT) of FIG. 4 may result according to a tree type. Various combinations of tree types, such as QT/QT+BT/QT+BT+TT may be available according to an encoding/decoding configuration.

The following examples are processes of finally dividing a coding block obtained in the above procedure into prediction blocks and transform blocks. It is assumed that prediction, transformation, and inverse transformation are performed based on the size of each partition.

In Example 1, prediction may be performed by setting the size of a prediction block equal to that of a coding block, and transformation and inverse transformation may be performed by setting the size of a transform block equal to that of the coding block (or prediction block).

In Example 2, prediction may be performed by setting the size of a prediction block equal to that of a coding block. A transform block may be obtained by partitioning the coding block (or prediction block) and transformation and inverse transformation may be performed based on the size of the obtained transform block.

Here, a tree-based partitioning scheme may be adopted for the partitioning process, and a partition type such as a (no split), n (QT), b, c (BT), i, or I (TT) of FIG. 4 may result according to a tree type. Various combinations of tree types, such as QT/QT+BT/QT+BT+TT may be available according to an encoding/decoding configuration.

Here, the partitioning process may be an index-based partitioning scheme. A partition type such as a (no split), b, c, or d of FIG. 4 may be obtained according to an index type. Depending on an encoding/decoding configuration, various candidate groups such as {a, b, c} and {a, b, c, d} may be configured.

In Example 3, a prediction block may be obtained by partitioning a coding block, and subjected to prediction based on the size of the obtained prediction block. For a transform block, its size is set to the size of the coding block, and transformation and inverse transformation may be performed on the transform block. In this example, the prediction block and the transform block may be in an independent relationship.

An index-based partitioning scheme may be used for the partitioning process, and a partitioning type such as a (no split), b to g, n, r, or s of FIG. 4 may be obtained according to an index type. Various candidate groups such as {a, b, c, n}, {a to g, n}, and {a, r, s}, may be configured according to an encoding/decoding configuration.

In Example 4, a prediction block may be obtained by partitioning a coding block, and subjected to prediction based on the size of the obtained prediction block. For a transform block, its size is set to the size of the prediction block, and transformation and inverse transformation may be performed on the transform block. In this example, the transform block may have a size equal to the size of the obtained prediction block or vice versa (the size of the transform block is set as the size of the prediction block).

A tree-based partitioning scheme may be used for the partitioning process, and a partition type such as a (no split), b, c (BT), i, I (TT), or n (QT) of FIG. 4 may be generated according to a tree type. Depending on an encoding/decoding configuration, various combinations of tree types such as QT/BT/QT+BT may be available.

Here, an index-based partitioning scheme may be used for the partitioning process, and a partition type such as a (no split), b, c, n, o, or p of FIG. 4 may result according to an index type. Various candidate groups such as {a, b}, {a, c}, {a, n}, {a, o}, {a, p}, {a, b, c}, {a, o, p}, {a, b, c, n}, and {a, b, c, n, p} may be configured depending on an encoding/decryption configuration. Further, a candidate group may be configured in the VSI scheme alone or the CSI scheme and the VSI scheme in combination, as the index-based partitioning scheme(s).

In Example 5, a prediction block may be obtained by partitioning a coding block, and subjected to prediction based on the size of the obtained prediction block. A transform block may also be obtained by partitioning the coding block and subjected to transformation and inverse transformation based on the size of the obtained transform block. In this example, each of a prediction block and a transform block may result from partitioning a coding block.

Here, a tree-based partitioning scheme and an index-based partitioning scheme may be used for the partitioning process, and a candidate group may be configured in the same manner as or in a similar manner to in Example 4.

In this case, the above examples are cases that may occur depending on whether a process of partitioning each block type is shared, which should not be construed as limiting the present disclosure. Various modification examples may also be available. Further, a block partitioning configuration may be determined in consideration of various encoding/decoding factors as well as a block type.

The encoding/decoding factors may include an image type (I/P/B), a color component (YCbCr), a block size/shape/position, a block width-height ratio, a block type (coding block, prediction block, transform block, or quantization block), a partition state, a coding mode (Intra/Inter), prediction-related information (intra-prediction mode or inter-prediction mode), transformation-related information (transformation scheme selection information), quantization-related information (quantization region selection information and quantized transform coefficient coding information).

In an image encoding method according to an embodiment of the present disclosure, intra-prediction may be configured as follows. Intra-prediction of the prediction unit may include a reference pixel configuration step, a prediction block generation step, a prediction mode determination step, and a prediction mode encoding step. Further, the image encoding apparatus may be configured to include a reference pixel configuration unit, a prediction block generator, and a prediction mode encoder to perform the reference pixel configuration step, the prediction block generation step, the prediction mode determination step, and the prediction mode encoding step. A part of the above-described steps may be omitted or other steps may be added. The steps may be performed in a different order from that described above.

Figure 5:
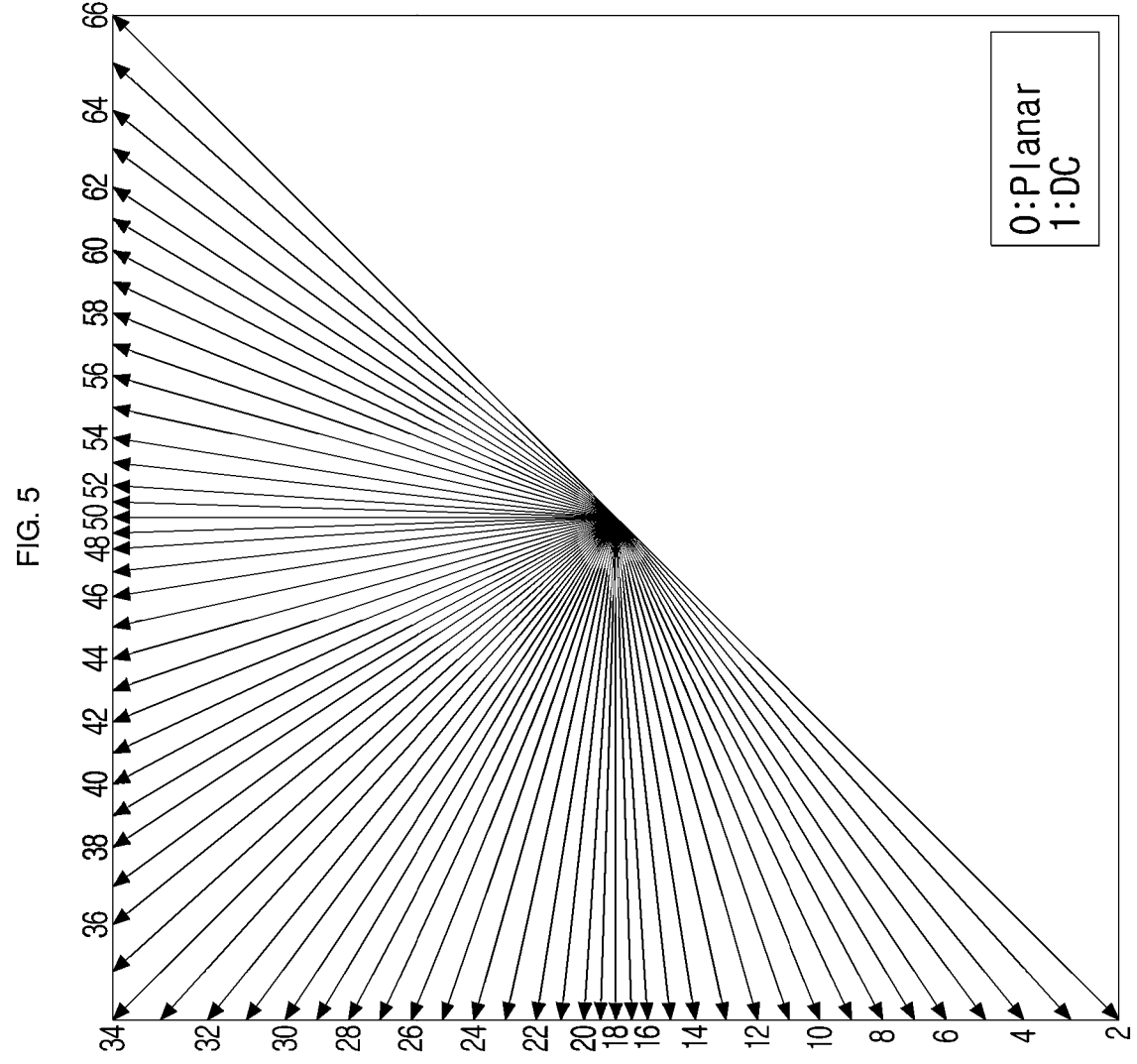
FIG. 5 is an exemplary diagram illustrating intra-prediction modes according to an embodiment of the present disclosure.

FIG. 5 is an exemplary diagram illustrating intra-prediction modes according to an embodiment of the present disclosure.

Referring to FIG. 5, 67 prediction modes are grouped into a prediction mode candidate group for intra-prediction. While the following description is given with the appreciation that among the 67 prediction modes, 65 prediction modes are directional modes and 2 predictions modes are non-directional modes (DC and planar), the present disclosure is not limited thereto and various configurations are available. The directional modes may be distinguished from each other by inclination information (e.g., dy/dx) or angle information (degrees). All or a part of the prediction modes may be included in a prediction mode candidate group of a luma component or a chroma component, and other additional modes may be included in the prediction mode candidate group.

In the present disclosure, the directional modes may be directed in straight lines, and a curved directional mode may be additionally configured as a prediction mode. Further, the non-directional modes may include the DC mode in which a prediction block is obtained by averaging (or weighted-averaging) the pixels of blocks neighboring to a current block (e.g., top, left, top-left, top-right, and bottom-right blocks) and the planar mode in which a prediction block is obtained by linearly interpolating the pixels of neighbor blocks.

In the DC mode, reference pixels used to generate a prediction block may be obtained from any of various combinations of blocks, such as left, top, left+top, left+bottom-left, top+top-right, left+top+bottom-left+top-right, and so on. The position of a blocks from which reference pixels are obtained may be determined according to an encoding/decoding configuration defined by an image type, a color component, a block size/type/position, and so on.

In the planar mode, pixels used to generate a prediction block may be obtained from a region with reference pixels (e.g., left, top, top-left, top-right, and bottom-left regions) and a region without reference pixels (e.g., right, bottom, and bottom-right regions). The region without reference pixels (i.e., not encoded) may be obtained implicitly by using one or more pixels of the region with reference pixels (e.g., by copying or weighted-averaging) or information about at least one pixel in the region not composed of reference pixels may be explicitly generated. Accordingly, a prediction block may be generated using the region with reference pixels and the region without reference pixels as described above.

Other non-directional modes than described above may be included additionally. In the present disclosure, the linear directional modes and the non-directional modes, DC and planar have mainly been described. However, modifications may be made to the modes.

The prediction modes illustrated FIG. 5 may be fixedly supported regardless of block sizes. Further, prediction modes supported according to block sizes may be different from those of FIG. 5.

For example, the number of prediction mode candidate groups may be adaptive (e.g., although the angle between every adjacent two prediction modes is equal, the angle may be set differently, such as 9, 17, 33, 65, or 129 directional modes). Alternatively, the number of prediction mode candidate groups may be fixed, but with a different configuration (e.g., a directional mode angle and a non-directional mode type).

Further, the prediction modes of FIG. 5 may be fixedly supported regardless of block types. Further, prediction modes supported according to block types may be different from those of FIG. 5.

For example, the number of prediction mode candidates may be adaptive (e.g., more or fewer prediction modes may be derived in the horizontal or vertical direction according to the width-height ratios of blocks). Alternatively, the number of prediction mode candidates may be fixed, but with different configurations (e.g., prediction modes may be derived more elaborately along the horizontal or vertical direction according to the width-height ratios of blocks).

Alternatively, a larger number of prediction modes may be supported for a longer side of a block, whereas a smaller number of prediction modes may be supported for a shorter side of the block. Regarding a prediction mode interval on the longer side of the block, modes located to the right of mode 66 (e.g., modes at angles of +45 degrees or more from mode 50, such as mode 67 to mode 80) or modes located to the left of mode 2 (e.g., modes at angles of −45 degrees or less from mode 18, such as mode −1 to mode −14) may be supported. This may be determined according to the width-height ratio of the block, and the opposite situation may also be possible.

While fixedly supported prediction modes (regardless of any encoding/decoding factor) such as those of FIG. 5 are mainly described in the present disclosure, prediction modes supported adaptively according to an encoding configuration may also be configured.

Prediction modes may be classified based on horizontal and vertical modes (modes 18 and 50) and some diagonal modes (diagonal up right mode 2, diagonal down right mode 34, diagonal down left mode 66, and so on). This classification may be based on some directionalities (or angles such as 45 degrees, 90 degrees, and so on).

Modes located at both ends of the directional modes (modes 2 and 66) may serve as reference modes for classification of the prediction modes, which is possible when intra-prediction modes are configured as illustrated in FIG. 5. That is, when prediction modes are configured adaptively, the reference modes may be changed. For example, mode 2 may be replaced with a mode with an index less than or greater than 2 (e.g., −2, −1, 3, 4, or the like), or mode 66 may be replaced with a mode with an index less than or greater than 66 (e.g., 64, 66, 67, 68, or the like).

Further, additional prediction modes related to a color component (color copy mode and color mode) may be included in the prediction mode candidate group. The color copy mode may refer to a prediction mode related to a method of obtaining data for generating a prediction block from a region located in another color space, and the color mode may refer to a prediction mode related to a method of obtaining a prediction mode from a region located in another color space.

Figure 6:
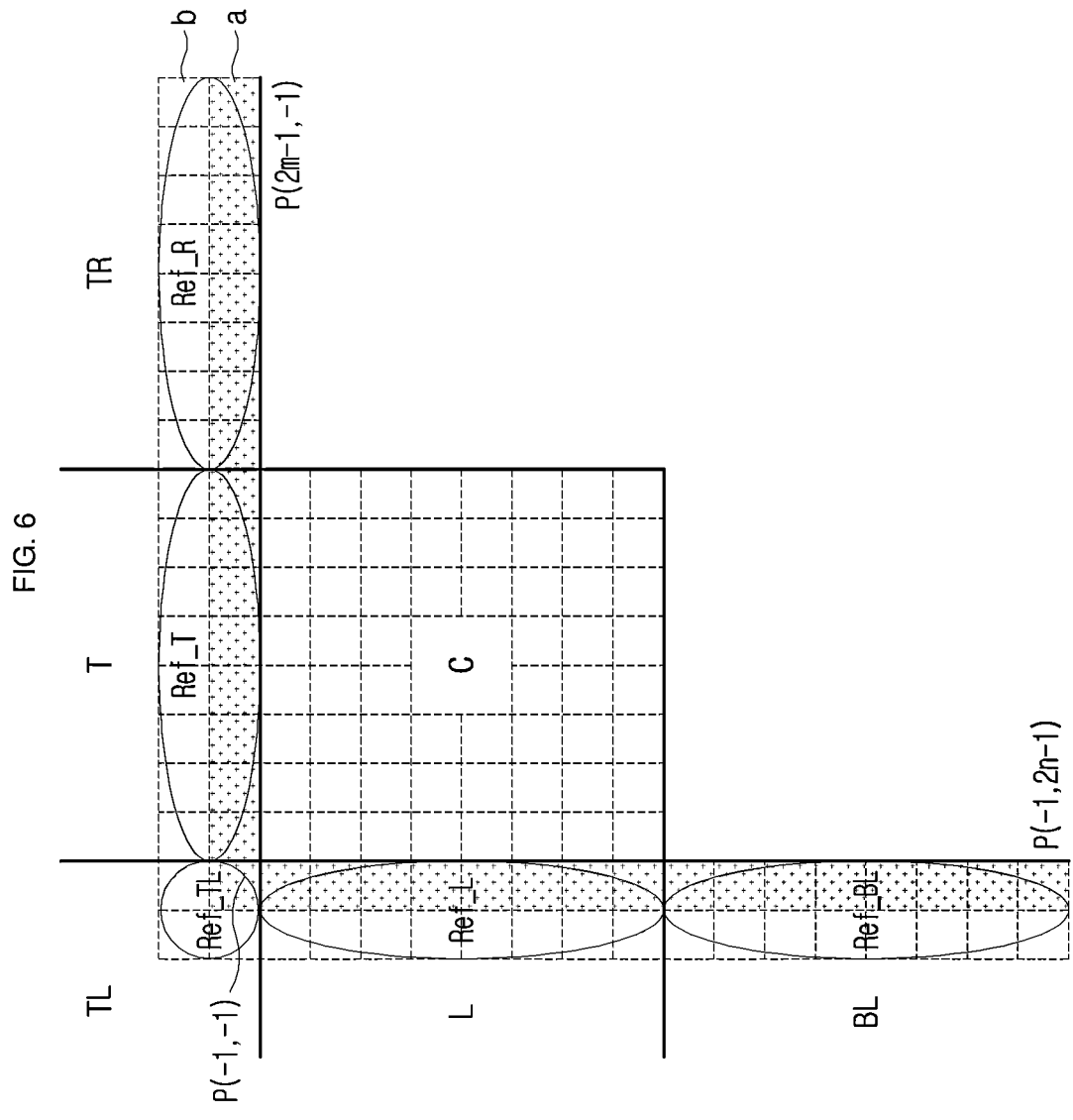
FIG. 6 is an exemplary diagram illustrating a configuration of reference pixels used for intra-prediction according to an embodiment of the present disclosure.

FIG. 6 is an exemplary diagram illustrating a reference pixel configuration used for intra-prediction according to an embodiment of the present disclosure. The size and shape M×N of a prediction block may be obtained through the block splitter.

Although it may be typical to perform intra-prediction on a prediction block basis, intra-prediction may also be performed on a coding block or a transform block basis according to the configuration of the block splitter. After checking block information, the reference pixel configuration unit may configure reference pixels for use in predicting a current block. The reference pixels may be managed in a temporary memory (e.g., an array, a primary array, a secondary array, or the like). The reference pixels may be generated and removed in each intra-prediction process for a block, and the size of the temporary memory may be determined according to the reference pixel configuration.

In this example, it is assumed that the left, top, top-left, top-right, and bottom-left blocks of a current block are used for prediction of the current block. However, the present disclosure is not limited thereto, and a block candidate group of a different configuration may be used for prediction of the current block. For example, a candidate group of neighbor blocks for reference pixels may be determined based on a raster or Z scan, and some candidates may be removed from the candidate group according to a scan order, or another block candidate group (e.g., the right, bottom, and bottom-right blocks) may further be included.

Further, if a prediction mode such as a color copy mode is supported, some region of a different color space may be used for prediction of the current block. Therefore, the region may also be considered for reference pixels.

Figure 7:
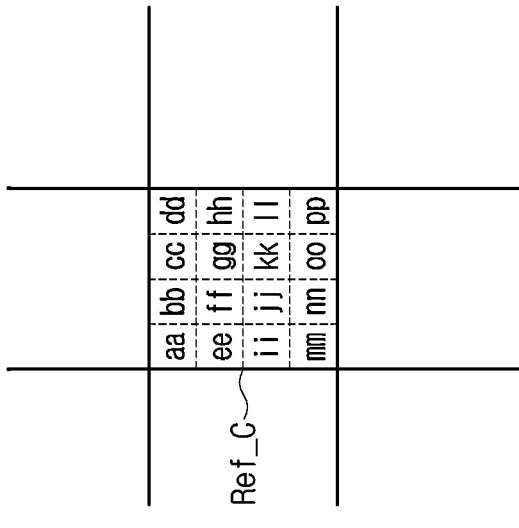
FIG. 7 is a conceptual diagram illustrating a target block for intra-prediction and blocks neighboring to the target block according to an embodiment of the present disclosure.

FIG. 7 is a conceptual diagram illustrating blocks neighboring to a target block for intra-prediction according to an embodiment of the present disclosure. Specifically, the left drawing of FIG. 7 illustrates blocks neighboring to a current block in a current color space, and the right drawing of FIG. 7 illustrates a corresponding block in another color space. For the convenience of description, the following description will be given on the assumption that blocks neighboring to a current block in a current color space are a basic reference pixel configuration.

As illustrated in FIG. 6, neighbor pixels in the left, top, top-left, top-right, and bottom-left blocks (Ref_L, Ref_T, Ref_TL, Ref_TR, and Ref_BL in FIG. 6) may be configured as reference pixels used for prediction of the current block. While the reference pixels are generally pixels closest to the current block in the neighbor blocks, as indicated by reference character a in FIG. 6 (referred to as a reference pixel line), other pixels (pixels b in FIG. 6 and pixels in other outer lines) may also be available as reference pixels.

Pixels neighboring to the current block may be classified into at least one reference pixel line. The pixels closest to the current block may be denoted by ref_0 (e.g., pixels spaced from the boundary pixels of the current block by a distance of 1, $p(−1,−1)$ to $p(2m−1,−1)$ and $p(−1,0)$ to $p(−1,2n−1)$), the second closest pixels may be denoted by ref_1 (e.g., pixels spaced from the boundary pixels of the current block by a distance of 2, $p(−2,−2)$ to $p(2m,−2)$ and $p(−2,−1)$ to $p(−2, 2n)$), and the third closest pixels are denoted by ref_2 (e.g., pixels spaced from the boundary pixels of the current block by a distance of 3, $p(−3,−3)$ to $p(2m+1,−3)$ and $p(−3,−2)$ to $p(−3, 2n+1)$). That is, reference pixel lines may be defined according to distances between the boundary pixels of the current block and neighbor pixels.

N or more reference pixel lines may be supported, and N may be an integer equal to or greater than 1, such as 1 to 5. Generally, the reference pixel lines are sequentially included in a reference pixel line candidate group in an ascending order of distances. However, the present disclosure is not limited thereto. For example, when N is 3, the candidate group may include reference pixel lines sequentially, such as <ref_0, ref_1, ref_2>. It is also possible to configure the candidate group non-sequentially such as <ref_0, ref_1, ref_3> or <ref_0, ref_2, ref_3>, or to configure the candidate group without the closest reference pixel line.

Prediction may be performed using all or a part (one or more) of the reference pixel lines in the candidate group.

For example, one of a plurality of reference pixel lines may be selected according to an encoding/decoding configuration, and intra-prediction may be performed using the reference pixel line. Alternatively, two or more of the plurality of reference pixel lines may be selected and intra-prediction may be performed using the selected reference pixel lines (e.g., by weighted-averaging data of the reference pixel lines).

A reference pixel line may be selected implicitly or explicitly. For example, the implicit selection implies that that a reference pixel line is selected according to an encoding/decoding configuration defined by one or more factors in combination, such as an image type, a color component, and a block size/shape/position. The explicit selection implies that that reference pixel line selection information may be generated at the block level.

While the present disclosure is described in the context of performing intra-prediction using the closest reference pixel line, it is to be understood that the later-described various embodiments may be implemented in the same manner or in a similar manner, when a plurality of reference pixel lines are used.

For example, a configuration in which the information is implicitly determined in consideration of use of the closest reference pixel line alone may be supported for subblock-wise intra-prediction as described later. That is, intra-prediction may be performed on a subblock basis, using a preset reference pixel line, and the reference pixel line may be selected implicitly. The reference pixel line may be, but not limited to, the closest reference pixel line.

Alternatively, a reference pixel line may be adaptively selected for subblock-wise intra-prediction, and various reference pixel lines including the closest reference pixel lone may be selected to perform subblock-wise intra-prediction. That is, intra-prediction may be performed on a subblock basis, using a reference pixel line determined in consideration of various encoding/decoding factors, and the reference pixel line may be selected implicitly or explicitly.

According to the present disclosure, the reference pixel configuration unit for intra-prediction may include a reference pixel generator, a reference pixel interpolator, and a reference pixel filter unit. The reference pixel configuration unit may include all or a part of the above components.

The reference pixel configuration unit may distinguish available pixels from unavailable pixels by checking their reference pixel availability. When a reference pixel satisfies at least one of the following conditions, the reference pixel is determined to be unavailable.

For example, if at least one of the following conditions is satisfied: the reference pixel is located outside a picture boundary; the reference pixel does not belong to the same partition unit as the current block (e.g., a unit that does not allow mutual referencing, such as a slice or tile. However, a unit allowing mutual referencing is an exception, despite a slice or tile); and the reference pixel has not been completely encoded/decoded, the reference pixel may be determined to be unavailable. That is, if none of the above conditions are satisfied, the reference pixel may be determined to be available.

The use of a reference pixel may be restricted by an encoding/decoding configuration. For example, even though a reference pixel is determined as available according to the above conditions, the use of the reference pixel may be restricted depending on whether constrained intra-prediction is performed (e.g., indicated by constrained_intra_pred_flag). Constrained intra-prediction may be performed when the use of a block reconstructed by referencing another image is banned for the purpose of robust encoding/decoding against errors due to an external factor such as a communication environment.

When constrained intra-prediction is deactivated (e.g., constrained_intra_pred_flag=0 for the I picture type or the P or B picture type), all reference pixel candidate blocks may be available.

On the contrary, when constrained intra-prediction is activated (for example, constrained_intra_pred_flag=1 for the P or B picture type), it may be determined whether to use a reference pixel candidate block according to an encoding mode (Intra or Inter). However, this condition may be set according to various other encoding/decoding factors.

Since reference pixels are in one or more blocks, the reference pixels may be classified into three types according to their reference pixel availability: fully available, partially available, and all unavailable. In the other cases except for fully available, reference pixels may be filled or generated at the position of an unavailable candidate block.

When a reference pixel candidate block is available, pixels at corresponding positions may be included in a reference pixel memory for the current block. The pixel data of the pixels may be copied as they are or may be included in the reference pixel memory after processes such as reference pixel filtering and reference pixel interpolation. On the contrary, when the reference pixel candidate block is unavailable, pixels obtained by the reference pixel generation process may be included in the reference pixel memory of the current block.

Examples of generating reference pixels at the position of an unavailable block in various methods will be described below.

For example, a reference pixel may be generated using an arbitrary pixel value. The arbitrary pixel value may be one of pixel values within a pixel value range (e.g., a pixel value range based on a bit depth or a pixel value range based on the pixel distribution of the corresponding image) (e.g., the minimum, maximum, or median value of the pixel value range). Specifically, this example may be applicable when a whole reference pixel candidate block is not available.

Alternatively, a reference pixel may be generated from a region in which image encoding/decoding has been completed. Specifically, the reference pixel may be generated from at least one available block neighboring to the unavailable block. At least one of extrapolation, interpolation, or copy may be used in generating the reference pixel.

After the reference pixel interpolator completes configuring reference pixels, the reference pixel interpolator may generate a fractional reference pixel by linear interpolation between reference pixels. Alternatively, the reference pixel interpolation process may be performed after a reference pixel filtering process described later.

Interpolation is not performed in the horizontal modes, the vertical modes, and some diagonal modes (e.g. modes at 45 degrees from the vertical/horizontal line, such as the diagonal up right, diagonal down right, and diagonal down left modes corresponding to modes 2, 34, and 66 in FIG. 5), the non-directional modes, the color copy mode, and so on. In the other modes (the other diagonal modes), the interpolation process may be performed.

Depending on a prediction mode (e.g., the directionality of the prediction mode, dy/dx, and so on) and the positions of a reference pixel and a prediction pixel, the position of a pixel to be interpolated (i.e., a factional unit to be interpolated, ranging from 1/2 to 1/64) may be determined. In this case, one filter (e.g., the same filter is assumed in an equation used to determine a filter coefficient or the length of a filter tap, but a filter for which only a coefficient is adjusted according to a fractional precision such as 1/32, 7/32, or 19/32 is assumed) may be applied, or one of a plurality of filters (e.g., filters for which different equations are used to determine a filter coefficient or the length of a filter tap is assumed) may be selected and applied according to the fractional unit.

In the former case, integer pixels may be used as inputs for interpolation of fractional pixels, while in the latter case, an input pixel is different in each step (e.g., an integer pixel is used for a 1/2 unit, and an integer pixel and a 1/2-unit pixel are used for a 1/4 unit). However, the present disclosure is not limited thereto and will be described in the context of the former case.

Fixed filtering or adaptive filtering may be performed for reference pixel interpolation. The fixed filtering or the adaptive filtering may be determined according to an encoding/decoding configuration (e.g., one or more of an image type, a color component, a block position/size/shape, the width-height ratio of a block, and a prediction mode).

In fixed filtering, reference pixel interpolation may be performed using one filter, whereas in adaptive filtering, reference pixel interpolation may be used using one of a plurality of filters.

In adaptive filtering, one of the plurality of filters may be implicitly or explicitly determined according to an encoding/decoding configuration. The filters may include a 4-tap DCT-IF filter, a 4-tap cubic filter, a 4-tap Gaussian filter, a 6-tap Wiener filter, and an 8-tap Kalman filter. A supported filter candidate group may be defined differently (e.g., the types of filters are partially the same or different, and the lengths of filter taps are short or long) according to a color component.

As the reference pixel filter unit reduces the remaining degradation in the encoding/decoding process, filtering may be performed for reference pixels, for the purpose of increasing prediction accuracy. The used filters may be, but not limited to, low-pass filters. It may be determined whether to apply filtering according to an encoding/decoding configuration (derivable from the foregoing description). Further, when filtering is applied, fixed filtering or adaptive filtering may be used.

Fixed filtering means that reference pixel filtering is not performed or reference pixel filtering is applied using one filter. Adaptive filtering means that whether to apply filtering is determined according to an encoding/decoding configuration, and when two or more filter types are supported, one of the filter types may be selected.

For the filter types, a plurality of filters distinguished from each other by filter coefficients, filter tap lengths, and so on may be supported, such as a 3-tap filter of [1, 2, 1]/4 and a 5-tap filter of [2, 3, 6, 3, 2]/16.

The reference pixel interpolator and the reference pixel filter unit described in relation to the reference pixel configuration step may be components required to improve the prediction accuracy. The two processes may be performed independently or in combination (i.e., in one filtering).

The prediction block generator may generate a prediction block in at least one prediction mode, and reference pixels may be used based on the prediction mode. The reference pixels may be used in a method (directional modes) such as extrapolation or a method (non-directional modes) such as interpolation, averaging (DC), or copy.

The prediction mode decision unit performs a process of selecting a best mode from a group of a plurality of prediction mode candidates. In general, the best mode may be determined in terms of coding cost, using a rate-distortion scheme in which block distortion (e.g., the distortion, sum of absolute difference (SAD), and sum of square difference (SSD) of the current block and a reconstructed block) and the number of generated bits according to the mode are considered. A prediction block generated based on the prediction mode determined in the above process may be transmitted to the subtraction unit and the add unit.

All prediction modes of the prediction mode candidate group may be searched in order to determine the best prediction mode, or the best prediction mode may be selected in a different decision process to reduce a computation volume/complexity. For example, some modes having good performance in terms of image quality deterioration are selected from among all intra-prediction mode candidates in a first step, and the best prediction mode may be selected, taking into account the numbers of generated bits as well as image quality deterioration of the modes selected in the first step, in a second step. Aside from this method, various other methods of determining a best prediction mode with a reduced computation volume/complexity may be applied.

Further, although the prediction mode decision unit may generally be included only in the encoder, it may also be included in the decoder according to an encoding/decoding configuration, for example, when template matching is included as a prediction method or an intra-prediction mode is derived from a region neighboring to the current block. In the latter case, it may be understood that a method of implicitly obtaining a prediction mode in the decoder is used.

The prediction mode encoder may encode the prediction mode selected by the prediction mode decision unit. Information about the index of the prediction mode in the prediction mode candidate group may be encoded, or the prediction mode may be predicted and information about the prediction mode may be encoded. The former method may be applied to, but not limited to, a luma component, and the latter method may be applied to, but not limited to, a chroma component.

When a prediction mode is predicted and then encoded, the prediction value (or prediction information) of the prediction mode may be referred to as a most probable mode (MPM). MPMs may include one or more prediction modes. The number k of MPMs may be determined according to the number of prediction mode candidate groups (k is an integer equal to or greater than 1, such as 1, 2, 3, or 6). When there are a plurality of prediction modes as MPMs, they may be referred to as an MPM candidate group.

The MPM candidate group may be supported under a fixed configuration, or under an adaptive configuration according to various encoding/decoding factors. In an example of an adaptive configuration, a candidate group configuration may be determined according to which reference pixel layer is used among a plurality of reference pixel layers, and whether intra-prediction is performed at the block level or at the subblock level. For the convenience of description, it is assumed that an MPM candidate group is configured under one configuration, and it should be understood that not only the MPM candidate group but also other intra-prediction candidate groups may be adaptively configured.

MPM is a concept supported to efficiently encode a prediction mode, and a candidate group may be configured with prediction modes having a high probability of actually being used as a prediction mode for the current block.

For example, the MPM candidate group may include preset prediction modes (or statistically frequent prediction modes, the DC mode, the planar mode, the vertical modes, the horizontal modes, or some diagonal modes) and the prediction modes of neighbor blocks (left, top, top-left, top-right, bottom-left blocks, and so on). The prediction modes of the neighbor blocks may be obtained from L0 to L3 (left block), T0 to T3 (top block), TL (top-left block), R0 to R3 (top-right block), and B0 to B3 (bottom-left block) in FIG. 7.

If the MPM candidate group may be formed from two or more subblock positions (e.g., L0 and L2) in a neighbor block (e.g., the left block), the prediction modes of the corresponding block may be configured in the candidate group according to predefined priorities (e.g., L0-L1-L2). Alternatively, when the MPM candidate group may not be configured from two or more subblock positions, the prediction mode of a subblock at a predefined position (e.g., L0) may be configured in the candidate group. Specifically, prediction modes at positions L3, T3, TL, R0, and B0 in neighbor blocks may be selected as prediction modes of the neighbor blocks and included in the MPM candidate group. The above description is for a case in which the prediction modes of neighbor blocks are configured in a candidate group, which should not be construed as limiting the present disclosure. It is assumed that a prediction mode at a predefined position is configured in a candidate group in the following example.

When one or more prediction modes are included in the MPM candidate group, a mode derived from the previously included one or more prediction modes may be additionally configured in the MPM candidate group. Specifically, when a kth mode (directional mode) is included in the MPM candidate group, a mode derivable from the mode (a mode spaced from the kth mode by a distance of +a or −b where each of a and b is an integer equal to or greater than 1 such as 1, 2, or 3) may be additionally included in the MPM candidate group.

Modes may be prioritized for configuring the MPM candidate group. The MPM candidate group may be configured to include prediction modes in the order of the prediction mode of a neighbor block, a preset prediction mode, and a derived prediction mode. The process of configuring the MPM candidate group may be completed by filling a maximum number of MPM candidates according to priorities. In the above process, if a prediction mode is identical to a previously included prediction mode, the prediction mode may not be included in the MPM candidate group and the next-priority candidate may be taken and subjected to redundancy check.

The following description is given on the assumption that the MPM candidate group includes 6 prediction modes.

For example, the MPM candidate group may be formed in the order of L-T-TL-TR-BL-Planar-DC-Vertical-Horizontal-Diagonal. The prediction mode of a neighbor block may be included with priority in the MPM candidate group, and then a preset prediction mode may be additionally configured in this case.

Alternatively, the MPM candidate group may be formed in the order of L-T-Planar-DC-<L+1>-<L−1>-<T+1>-<T−1>-Vertical-Horizontal-Diagonal. In this case, the prediction modes of some neighbor blocks and some of preset prediction modes may be included with priority, and a mode derived on the assumption that a prediction mode in a direction similar to that of a neighbor block will be generated and some of preset predictions modes may be additionally included.

The above examples are merely a part of MPM candidate group configurations. The present disclosure is not limited thereto and various modification examples may be available.

The MPM candidate group may be represented by binarization such as unary binarization or truncated Rice binarization based on indexes within the candidate group. That is, short bits may be allocated to a candidate having a small index, and long bits may be allocated to a candidate having a large index, to represent mode bits.

Modes which are not included in the MPM candidate group may be classified as a non-MPM candidate group. Two or more non-MPM candidate groups may be defined according to an encoding/decoding configuration.

The following description is given on the assumption that 67 modes including directional modes and non-directional modes are included in a prediction mode candidate group, 6 MPM candidates are supported, and thus a non-MPM candidate group includes 61 prediction modes.

If one non-MPM candidate group is configured, this implies that there are remaining prediction modes which are not included in the MPM candidate group, and thus an additional candidate group configuration process is not required. Therefore, binarization such as fixed length binarization and truncated unary binarization may be used based on indexes within the non-MPM candidate group.

On the assumption that two or more non-MPM candidate groups are configured, the non-MPM candidate groups are classified into non-MPM_A (candidate group A) and non-MPM_B (candidate group B). It is assumed that candidate group A (p candidates, where p is equal to or larger than the number of MPM candidates) includes prediction modes having a higher probability of being the prediction mode of the current block than candidate group B (q candidates, where q is equal to or larger than the number of candidates in candidate group A). Herein, a process of configuring candidate group A may be added.

For example, some equi-distant prediction modes (e.g., modes 2, 4, and 6) among the directional modes may be included in candidate group A or a preset prediction mode (e.g., a mode derived from a prediction mode included in the MPM candidate group) may be included in candidate group A. The remaining prediction modes after the MPM candidate group configuration and the candidate group A configuration may form candidate group B, and an additional candidate group configuration process is not required. Binarization such as fixed length binarization and truncated unary binarization may be used based on indexes in candidate group A and candidate group B.

The above examples are a part of cases in which two or more non-MPM candidate groups are formed. The present disclosure is not limited thereto, and various modification examples are available.

A process of predicting and encoding a prediction mode will be described below.

Information (mpm_flag) indicating whether the prediction mode of the current block coincides with an MPM (or a mode in the MPM candidate group) may be checked.

When the prediction mode of the current block matches an MPM, MPM index information (mpm_idx) may be additionally checked according to an MPM configuration (one or more configurations). Then, the encoding process of the current block is completed.

When the prediction mode of the current block does not match any MPM, if there is one configured non-MPM candidate group, non-MPM index information (remaining_idx) may be checked. Then, the encoding process of the current block is completed.

If a plurality of non-MPM candidate groups (two in this example) are configured, information (non_mpm_flag) indicating whether the prediction mode of the current block coincides with any prediction mode in candidate group A may be checked.

If the prediction mode of the current block matches any candidate in candidate group A, index information about candidate group A (non_mpm_A_idx) may be checked, and if the prediction mode of the current block does not match any candidate in candidate group A, candidate B index information (remaining_idx) may be checked. Then, the encoding process of the current block is completed.

When the prediction mode candidate group configuration is fixed, a prediction mode supported by the current block, a prediction mode supported by a neighbor block, and a preset prediction mode may use the same prediction number index.

When the prediction mode candidate group configuration is adaptive, the prediction mode supported by the current block, the prediction mode supported by the neighbor block, and the preset prediction mode may use the same prediction number index or different prediction number indexes. With reference to FIG. 5, the following description is given.

In the prediction mode encoding process, a process of unifying (or adjusting) prediction mode candidate groups to configure an MPM candidate group or the like may be performed. For example, the prediction mode of the current block may be one prediction mode of a prediction mode candidate group with mode −5 to mode 61, and the prediction mode of a neighbor block may be one prediction mode in a candidate group with mode 2 to mode 66. In this case, since a part (mode 66) of the prediction modes of the neighbor block may not be supported as a prediction mode for the current block, a process of unifying prediction modes in the prediction mode encoding process may be performed. That is, this process may not be required when a fixed intra-prediction mode candidate group configuration is supported, and this process may be required when an adaptive intra-prediction mode candidate group configuration is sup-ported, which will not be described in detail herein.

Unlike the MPM-based method, encoding may be per-formed by assigning indexes to the prediction modes of a prediction mode candidate group.

For example, prediction modes are indexed according to their predefined priorities. When a prediction mode is selected as the prediction mode of the current block, the index of the selected prediction mode is encoded. This means a case in which a fixed prediction mode candidate group is configured and fixed indexes are assigned to prediction modes.

Alternatively, when the prediction mode candidate group is adaptively configured, the fixed index allocation method may not be suitable. Thus, prediction modes may be indexed according to adaptive priorities. When a prediction mode is selected as the prediction mode of the current block, the selected prediction mode may be encoded. This method may enable effective encoding of a prediction mode because the indexes of the prediction modes are changed due to the adaptive configuration of the prediction mode candidate group. That is, the adaptive priorities may be intended to allocate a candidate with a high probability of being selected as the prediction mode of the current block to an index for which short mode bits are generated.

The following description is based on the assumption that 8 prediction modes including preset prediction modes (di-rectional modes and non-directional modes), the color copy mode, and the color mode are supported in a prediction mode candidate group (a case of a chroma component).

For example, it is assumed that preset four modes among the planar, DC, horizontal, vertical, and diagonal modes (diagonal down left in this example), one color mode C, and three color copy modes CP1, CP2, and CP3 are supported. The prediction modes may be indexed basically in the order of preset prediction mode, color copy mode, and color mode.

In this case, the preset prediction modes which are direc-tional modes and non-directional modes, and the color copy mode are prediction modes which are distinguished by prediction methods and thus may easily be identified. How-ever, the color mode may be a directional mode or a non-directional mode, which is likely to overlap with a preset prediction mode. For example, when the color mode is a vertical mode, the color mode may overlap with a vertical mode that is one of the preset prediction modes.

In the case where the number of prediction mode candi-dates is adaptively adjusted according to an encoding/decoding configuration, when there is a redundant case, the number of candidates may be adjusted (8→7). Alternatively, in the case where the number of prediction mode candidates is kept fixed, when there is a redundant prediction mode, indexes may be allocated by adding and considering another candidate. Further, the adaptive prediction mode candidate group may be supported even when a variable mode such as a color mode is included. Therefore, an adaptive index allocation case may be regarded as an example of config-uring an adaptive prediction mode candidate group.

Now, a description will be given of adaptive index allo-cation according to a color mode. It is assumed that indexes are allocated basically in the order of Planar(0)-Vertical (1)-Horizontal (2)-DC(3)-CP1(4)-CP2(5)-CP3(6)-C(7). Further, if the color mode does not match any preset prediction mode, it is assumed that index allocation is performed in the above order.

For example, if the color mode matches one of the preset prediction modes (the planar, vertical, horizontal, and DC modes), a prediction mode matching the index 7 of the color mode is filled. A preset prediction mode (diagonal down left) is filled at the index (one of 0 to 3) of the matching prediction mode. Specifically, when the color mode is a horizontal mode, indexes may be allocated in the order of Planar (0)-Vertical (1)-Diagonal down left(2)-DC(3)-CP1 (4)-CP2(5)-CP3(6)-Horizontal(7).

Alternatively, when the color mode matches one of the preset prediction modes, the matching prediction mode is filled at index 0, and a preset prediction mode (diagonal down left) is filled at the index 7 of the color mode. In this case, if the filled prediction mode is not the existing index 0 (that is, it is not the planar mode), the existing index configuration may be adjusted. Specifically, when the color mode is the DC mode, indexes may be allocated in the order of DC(0)-Planar(1)-Vertical(2)-Horizontal(3)-CP1(4)-CP2 (5)-CP3(6)-Diagonal down left (7).

The above example is a mere part of adaptive index allocations. The present disclosure is not limited thereto, and various modification examples may be available. Further, binarization such as fixed length binarization, unary bina-rization, truncated unary binarization, and truncated Rice binarization may be used based on the indexes in the candidate group.

Another example of performing encoding by assigning indexes to prediction modes belonging to a prediction mode candidate group will be described.

For example, prediction modes and prediction methods are classified into a plurality of prediction mode candidate groups and an index is assigned to a prediction mode belonging to a corresponding candidate group and then encoded. In this case, encoding of candidate group selection information may precede the index encoding. For example, a directional mode, a non-directional mode, and a color mode, which are prediction modes in which prediction is performed in the same color space, may belong to one candidate group (referred to as candidate group S), and a color copy mode, which is a prediction mode in which prediction is performed in a different color space, may belong to another candidate group (referred to as candidate group D).

The following description is based on the assumption that 9 prediction modes including preset prediction modes, a color copy mode, and a color mode are supported in a prediction mode candidate group (a case of a chroma component).

For example, it is assumed that four preset prediction modes are supported from among the planar, DC, horizontal, vertical, and diagonal modes, one color mode C, and four color copy modes CP1, CP2, CP3, and CP4 are supported. Candidate group S may include 5 candidates being the preset prediction modes and the color mode, and candidate group D may include 4 candidates being the color copy modes.

Candidate group S is an example of an adaptively con-figured prediction mode candidate group. An example of adaptive index allocation has been described above, and thus will not be described in detail herein. Since candidate group D is an example of a fixed prediction mode candidate group, a fixed index allocation method may be used. For example, indexes may be assigned in the order of CP1(0)-CP2(1)-CP3(2)-CP4(3).

Binarization such as fixed length binarization, unary binarization, truncated unary binarization, and truncated Rice binarization may be used based on indexes within the candidate group. The present disclosure is not limited to the above example, and various modification examples may also be available.

A candidate group such as an MPM candidate group for prediction mode encoding may be configured at the block level. Alternatively, the process of configuring a candidate group may be omitted, and a predetermined candidate group or a candidate group obtained in various methods may be used. This may be a configuration supported for the purpose of reducing complexity.

In Example 1, one predefined candidate group may be used, or one of a plurality of predefined candidate groups may be used according to an encoding/decoding configuration. For example, in the case of an MPM candidate group, a predefined candidate group of, for example, Planar-DC-vertical-horizontal-Diagonal down left (66 in FIG. 5)—Diagonal down right (34 in FIG. 5} may be used. Alternatively, it may be possible to apply a candidate group configured when neighbor blocks are all unavailable, among MPM candidate group configurations.

In Example 2, a candidate group for a block which has been completely encoded may be used. The encoded block may be selected based on a coding order (a predetermined scanning scheme such as z-scan, vertical scan, horizontal scan, or the like), or from among blocks neighboring to the current block, such as the left, top, top-left, top-right, and bottom-left blocks. However, the neighbor blocks may be limited to blocks at the positions of partition units which may be mutually referenced with the current block (e.g., partition units having properties to which reference can be made even though the blocks belong to different slices or tiles, such as different tiles belonging to the same tile group). If a neighbor block belongs to a partition unit which does not allow referencing (e.g., when each block belongs to a different slice or tile and has properties which may not be mutually referenced to, for example, when each block belongs to a different block group), the block at the position may be excluded from candidates.

In this case, neighbor blocks may be determined according to the state of the current block. For example, when the current block is square, a candidate group of available blocks may be borrowed (or shared) from among blocks located according to a predetermined first priority. Alternatively, when the current block is rectangular, a candidate group of available blocks may be borrowed from among blocks located according to a predetermined second priority. The second or third priority may be supported according to the width-height ratio of the block. For selecting candidate blocks to be borrowed, priorities may be set in various configurations, such as left-top-top-right-bottom-left-top-left, or top-left-top-left-top-right-bottom-left. In this case, all of the first to third priorities may have the same configuration or different configurations, or a part of the priorities may have the same configuration.

A candidate group for the current block may be borrowed from neighbor blocks, only at or above/above a predetermined boundary value, or only at or below/below a predetermined boundary value. The boundary value may be defined as a minimum or maximum block size that allows borrowing of a candidate group. The boundary value may be represented as the width (W) of a block, the height (H) of the block, WxH, W*H, or the like, where each of W and H may be an integer equal to or greater than 4, 8, 16, or 32.

In Example 3, a common candidate group may be formed from a higher block being a predetermined group of blocks. The common candidate group may be used for lower blocks belonging to the higher block. The number of lower blocks may be an integer equal to or greater than 1, such as 1, 2, 3, or 4.

In this case, the higher block may be an ancestor block (including a parent block) of the lower blocks, or may be an arbitrary group of blocks. An ancestor block may refer to a pre-partitioning block in a previous step (a partitioning depth difference of 1 or more) during partitioning for obtaining lower blocks. For example, the parent block of sub-blocks 0 and 1 of 4N×2N in candidate b of FIG. 4 may be 4N×4N of candidate a in FIG. 4.

The candidate group for the higher block may be borrowed (or shared) from the lower blocks, only at or above/above a predetermined first boundary value or only at or below/below a predetermined second boundary value.

The boundary value may be defined as the minimum size or maximum size of a block for which candidate group borrowing is allowed. Only one or both of the boundary values may be supported, and the boundary value may be expressed as the width W, height H, W×H, W*H, or the like of the block, where each of W and H is an integer of 8, 16, 32, 64 or higher.

On the other hand, a candidate group for a lower block may be borrowed from a higher block, only at or above/above a predetermined third boundary value. Alternatively, a candidate group for a lower block may be borrowed from a higher block, only at or below/below a predetermined fourth boundary value.

In this case, the boundary value may be defined as the minimum size or maximum size of a block for which candidate group borrowing is allowed. Only one or both of the boundary values may be supported, and the boundary value may be expressed as the width W, height H, W×H, W*H, or the like of the block, where each of W and H is an integer of 4, 8, 16, 32, or higher.

In this case, the first boundary value (or the second boundary value) may be equal to or greater than the third boundary value (or the fourth boundary value).

Candidate borrowing (or sharing) may be selectively used based on any one of the above-described embodiments, and candidate group borrowing may be selectively used based on a combination of at least two of the first to third embodiments. Further, candidate group borrowing may be selectively used based on any of the detailed configurations of the embodiments, and may be selectively used according to a combination of one or more of the detailed configurations.

Further, information indicating whether a candidate group is borrowed, information about block attributes (size/type/position/width-height ratio) involved in the candidate group borrowing, and information about a partition state (a partition scheme, a partition type, a partitioning depth, and so on) may be explicitly processed. In addition, encoding factors such as an image type and a color component may act as input variables in a candidate group borrowing configuration. The candidate group borrowing may be performed based on the information and an encoding/decoding configuration.

Prediction-related information generated by the prediction mode encoder may be transmitted to the encoding unit and included in a bitstream.

In the video decoding method according to an embodiment of the present disclosure, intra-prediction may be configured as follows. Intra-prediction of the prediction unit may include a prediction mode decoding step, a reference pixel configuration step, and a prediction block generation step. In addition, the image decoding apparatus may be configured to include a prediction mode decoder, a reference pixel configuration unit, and a prediction block generator that perform the prediction mode decoding step, the reference pixel configuration step, and the prediction block generation step. A part of the above-described steps may be omitted or other steps may be added. The steps may be performed in a different order from the order described above.

Since the reference pixel configuration unit and the prediction block generator of the image decoding apparatus play the same roles as their counterparts of the image encoding apparatus, a detailed description of the reference pixel configuration unit and the prediction block generator is not provided herein. The prediction mode decoder may reversely perform the method used in the prediction mode encoder.

(Subblock-Wise Intra-Prediction)

Figure 8:
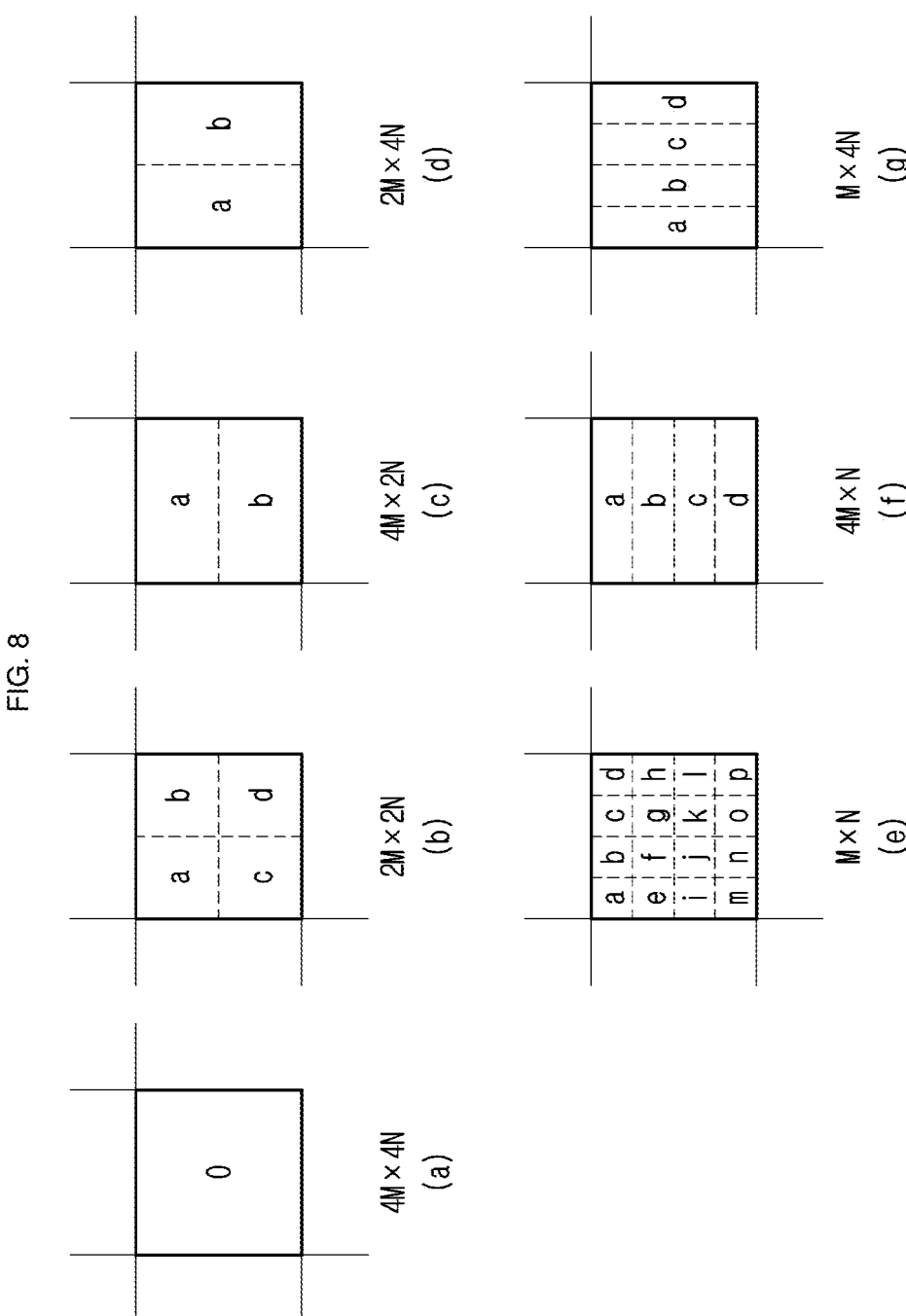
FIG. 8 is a diagram illustrating various subblock partition types which may be obtained from a coding block.

FIG. 8 illustrates various subblock partition types that may be obtained from a coding block. The coding block may be referred to as a parent block, and a subblock may be a child block. The subblock may be a prediction unit or a transform unit. In this example, it is assumed that one piece of prediction information is shared between subblocks. In other words, one prediction mode may be generated and used in each subblock.

Referring to FIG. 8, the coding order of subblocks may be determined according to various combinations of subblock a to subblock p of FIG. 8. For example, one of z-scan (left→right, top→bottom), vertical scan (top→bottom), horizontal scan (left→right), inverse vertical scan (bottom→top), and inverse horizontal scan (right→left) may be used.

The coding order may be pre-agreed between the image encoder and the image decoder. Alternatively, the coding order of subblocks may be determined in consideration of the partitioning direction of the parent block. For example, when the parent block is split in the horizontal direction, the coding order of the subblocks may be determined as the vertical scan. When the parent block is split in the vertical direction, the coding order of the subblocks may be determined as the horizontal scan.

When encoding is performed on a subblock basis, reference data used for prediction may be obtained at a closer position. Since only one prediction mode is generated and shared between the subblocks, the subblock-wise encoding may be efficient.

For example, referring to FIG. 8(*b*), when encoding is performed at the parent block level, the bottom-right subblock may be predicted using pixels neighboring to the parent block. On the other hand, when encoding is performed at the subblock level, the bottom-right subblock may be predicted using closer pixels than the parent block because there are the top-left, top-right, and bottom-left subblocks reconstructed in a predetermined coding order (Z scan in this example).

For intra-prediction through best partitioning based on image characteristics, a candidate group may be configured based on one or more partition types with a high probability of occurrence.

In this example, it is assumed that partitioning information is generated using an index-based partitioning scheme. A candidate group may be formed with various partition types as follows.

Specifically, a candidate group may be configured to include N partition types. N may be an integer equal to or greater than 2. The candidate group may include a combination of at least two of the 7 partition types illustrated in FIG. 8.

The parent block may be split into predetermined subblocks by selectively using any one of the plurality of partition types in to the candidate group. The selection may be made based on an index signaled by the image encoding apparatus. The index may refer to information specifying the partition type of the parent block. Alternatively, the selection may be made in consideration of the attributes of the parent block in the image decoding apparatus. The attributes may include a position, size, shape, width, width-height ratio, one of the width and height, a partitioning depth, an image type (I/P/B), a color component (e.g., luma or chroma), an intra-prediction mode value, whether the intra-prediction mode is a non-directional mode, the angle of the intra-prediction mode, the positions of reference pixels, and the like. The block may be a coding block or a prediction block and/or a transform block corresponding to the coding block. The position of the block may mean whether the block is located at the boundary of a predetermined image (or fragment image) of the parent block. The image (or fragment image) may be at least one of a picture, a slice group, a tile group, a slice, a tile, a CTU row, or a CTU, to which the parent block belongs.

In Example 1, a candidate group such as {a to d} or {a to g} of FIG. 8 may be configured. The candidate group may obtained in consideration of various partition types. In the case of the candidate group {a to d}, various binary bits may be allocated to each index (assuming that indexes are allocated in alphabetical order. The same assumption is also taken for the following example).

TABLE 1

| idx | bin type 1 | bin type 2 |
|-----|------------|------------|
| 0 | 00 | 0 |
| 1 | 01 | 10 |
| 2 | 10 | 110 |
| 3 | 11 | 111 |

In Table 1 above, bin type 1 may be an example of binarization in which all possible partition types are considered, and bin type 2 may be an example of binarization in which a bit indicating whether partitioning is performed (the first bit) is allocated first, and when partitioning is performed (the first bit is set to 1), only the non-split candidate is excluded from the available partition types.

In Example 2, a candidate group such as {a, c, d} or {a, f, g} of FIG. 8 may be formed, which may be obtained in consideration of partitioning in a specific direction (horizontal or vertical direction). In the case of the candidate group {a, f, g}, various binary bits may be allocated to each index.

TABLE 2

| idx | bin type 1 | bin type 2 | bin type 3 |
|-----|------------|------------|------------|
| 0 | 0 | 10 | 10 |
| 1 | 10 | 0 | 11 |
| 2 | 11 | 11 | 0 |

Table 2 above is an example of binarization allocated based on the attributes of a block, specifically an example of binarization performed in consideration of a block shape. In bin type 1, when a parent block is square, 1 bit is allocated when the parent block is not split, and 2 bits are allocated when the parent block is split in the horizontal or vertical direction.

In bin type 2, when the parent block is shaped into a rectangle elongated horizontally, 1 bit is allocated when the parent block is split in the horizontal direction, and 2 bits are allocated to the remaining cases. Bin type 3 may be an example of allocating 1 bit when the parent block is shaped into a rectangle elongated vertically. In bin type 3, 1 bit may be allocated when the parent block is split in the vertical direction, and 2 bits may be allocated in the remaining cases. This may be an example of allocating shorter bits when it is determined that partitioning is likely to occur further in the shape of the parent block. However, the present disclosure is not limited thereto, and modification examples including the opposite case may also be available.

In Example 3, a candidate group such as {a, c, d, f, g} of FIG. 8 may be configured, which may be another example of a candidate group configuration in which partitioning in a specific direction is considered.

TABLE 3

| idx | bin type 1 | bin type 2 |
| --- | --- | --- |
| 0 | 0 | 0 |
| 1 | 100 | 100 |
| 2 | 101 | 110 |
| 3 | 110 | 101 |
| 4 | 111 | 111 |

In Table 3, a flag (the first bit) indicating whether partitioning is performed is first allocated, and then, a flag identifying the number of partitionings is allocated next in bin type 1. If the flag (second bit) identifying the number of partitionings is set to 0, the number of partitionings may be 2, and if the flag (second bit) identifying the number of partitionings is set to 1, the number of partitionings may be 4. Further, the subsequent flag may indicate a partitioning direction. If the subsequent flag is 0, this may indicate horizontal partitioning, and if the subsequent flag is 1, this may indicate vertical partitioning. The above description is merely an example and the present disclosure is not limited thereto. Therefore, various modification examples including an opposite configuration may be available.

The partitioning information may be supported in a general situation, but may be modified to a different configuration according to an encoding/decoding environment. That is, it is possible to support an exceptional configuration for the partitioning information or to replace a partition type represented by the partitioning information with another partition type.

For example, there may be a partition type that is not supported according to the attributes of the block. Since the properties of the block have been mentioned in the previous example, their detailed description is not provided herein. The block may be at least one of a parent block or a subblock.

For example, it is assumed that the supported partition types are {a, f, g} in FIG. 8 and that the size of the parent block is 4M×4N. If some partition types are not supported due to a minimum value condition of the block in the image and the existence of the parent block at the boundary of a predetermined image (or fragment image), various processes may be performed. For the following example, it is assumed that the minimum value of the width of the block in the image is 2M and the minimum value of the area of the block is 4*M*N.

First, a candidate group may be reconfigured by excluding an unobtainable partition type. Candidates available in the existing candidate group may be 4M×4N, 4M×N, and M×4N, and the candidate group reconfigured without the unobtainable candidate (4M×N) may include partition types 4M×4N and 4M×N. In this case, binarization may be performed again on the candidates of the reconfigured candidate group. In this example, 4M×4N or 4M×N may be selected by one flag (1 bit).

In another example, the candidate group may be reconfigured by replacing the unobtainable partition type with another one. The unobtainable partition type may be a vertical-direction partition type (4 partitions). However, it is possible to reconfigure the candidate group by replacing another partition shape (for example, 2M×4N) that maintains the vertical-direction partition type. This may maintain the flag configuration based on the existing partitioning information.

As in the above example, a candidate group may be reconfigured by adjusting the number of candidates or replacing an existing candidate. The example includes a description of some cases, and various modification examples may be available.

(Subblock Coding Order)

It is possible to set a coding order for various subblocks as illustrated in FIG. 8. The coding order may be implicitly determined according to an encoding/decoding configuration. A partition type, an image type, a color component, the size/shape/position of a parent block, the width-height ratio of a block, information related to a prediction mode (e.g., an intra-prediction mode, the positions of used reference pixels, and so on), a partitioning state, and so on may be included in the encoding/decoding factors.

Alternatively, it is possible to explicitly process the coding order of subblocks. Specifically, a candidate group may be configured to include candidates with a high probability of occurrence according to the partition type, and selection information for one of the candidates may be generated. Therefore, coding order candidates supported according to the partition type may be adaptively configured.

As in the above example, subblocks may be encoded in one fixed coding order. However, an adaptive coding order may also be applied.

Referring to FIG. 8, many coding orders may be obtained by ordering a to p in various manners. Since the positions and number of obtained subblocks may vary according to partition types, it may be important to set a coding order specialized for each partition type. Further, a coding order is not required for the partition type illustrated in FIG. 8(a) in which partitioning into subblocks is not performed. Therefore, when information about a coding order is explicitly processed, partitioning information may first checked and then information about a coding order for subblocks may be generated based on selected partition type information.

Referring to FIG. 8(c), vertical scan in which 0 and 1 are applied to a and b and inverse scan to which 1 and 0 are applied to a and b, respectively, may be supported as candidates, and a 1-bit flag for selecting one of the scans may be generated.

Alternatively, referring to FIG. 8(b), z-scan with 0 to 3 applied to a to d, z-scan rotated 90 degrees to the left, with 1, 3, 0, and 2 applied to a to d, inverse z-scan with 3, 2, 1, and 0 applied to a to d, z-scan rotated 90 degrees to the right, with 2, 0, 3, and 1 applied to a to d may be supported, and a flag of one or more bits may be generated to select one of the scans.

A case in which the coding order of subblocks is implicitly determined will be described below. For the convenience of description, a coding order for the case where the partition types (c) {or (f)} and (d) {or (g)} of FIG. 8 are obtained is described (refer to FIG. 5 for the prediction modes).

For example, when intra-prediction modes are given as vertical modes, horizontal modes, diagonal down right modes (modes 19 to 49), diagonal down left modes (mode 51 or higher), and diagonal up right modes (mode 17 or lower), vertical scan and horizontal scan may be set.

Alternatively, when the intra-prediction modes are the diagonal down left modes (mode 51 or more), vertical scan and inverse horizontal scan may be set.

Alternatively, when the intra-prediction modes are the diagonal up right modes (mode 17 or lower), inverse vertical scan and horizontal scan may be set.

In the above examples, a coding order may be based on a predetermined scan order. In this case, the predetermined scan order may be one of z-scan, vertical scan, and horizontal scan. Alternatively, the scan order may be determined according to the positions and distances of pixels referenced during intra-prediction. For this purpose, inverse scan may be additionally considered.

Figure 9:
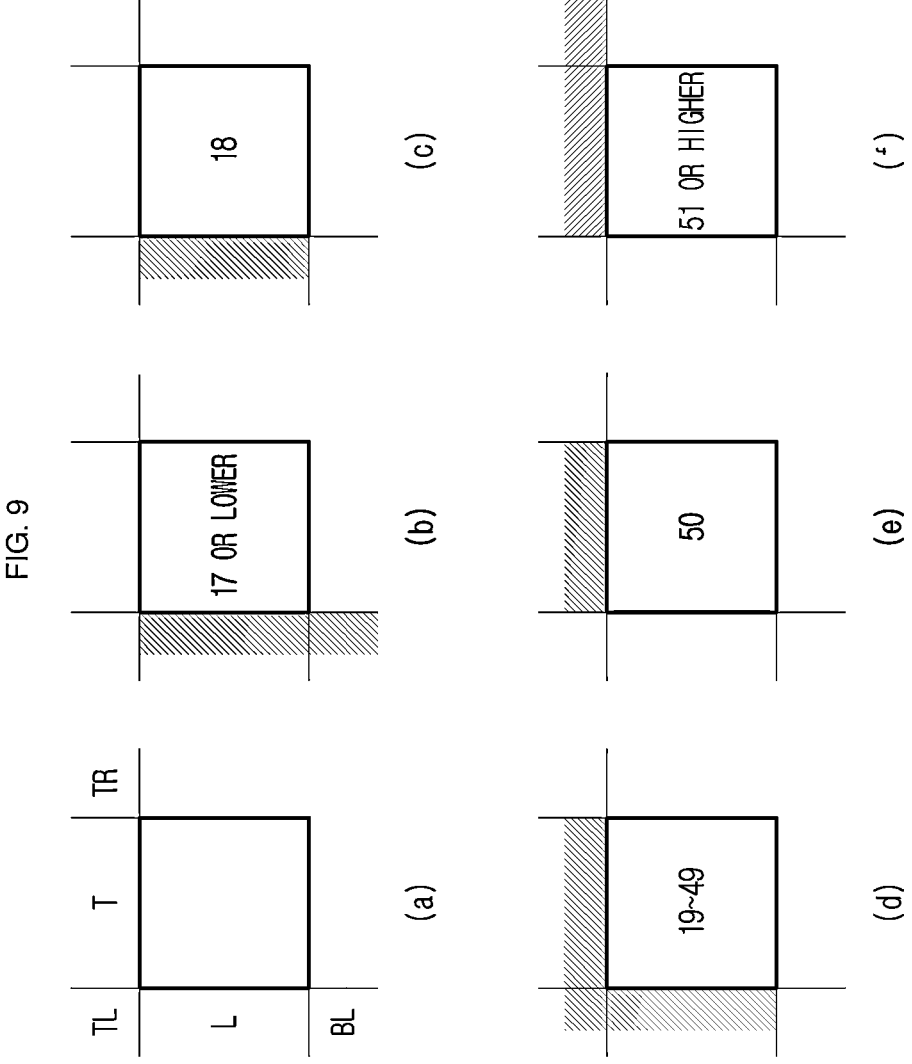
FIG. 9 is an exemplary diagram illustrating reference pixel regions used for intra-prediction modes according to an embodiment of the present disclosure.

FIG. 9 is an exemplary diagram illustrating reference pixel regions used for intra-prediction modes according to an embodiment of the present disclosure. Referring to FIG. 9, it may be noted that the reference regions are shaded according to the directions of the prediction modes.

FIG. 9(a) illustrates an example of dividing a region neighboring to a parent block into left, top, top-left, top-right, and bottom-left regions. FIG. 9(b) illustrates the left and bottom-left regions referenced in a diagonal up right mode, FIG. 9(c) illustrates the left region referenced in a horizontal mode, and FIG. 9(d) illustrates the left, top, and top-left regions referenced in a diagonal down right mode. FIG. 9(e) illustrates the top region referenced in a vertical mode, and FIG. 9(f) illustrates the top and top-right regions referenced in a diagonal down left mode.

When prediction is performed using neighbor reference pixels (or reconstructed pixels of a subblock), predefining the coding order of subblocks may advantageously obviate the need for separately signaling related information. Various partition types are available and thus the following examples may be provided based on referenced regions (or prediction modes) based on the partition types.

Figure 10:
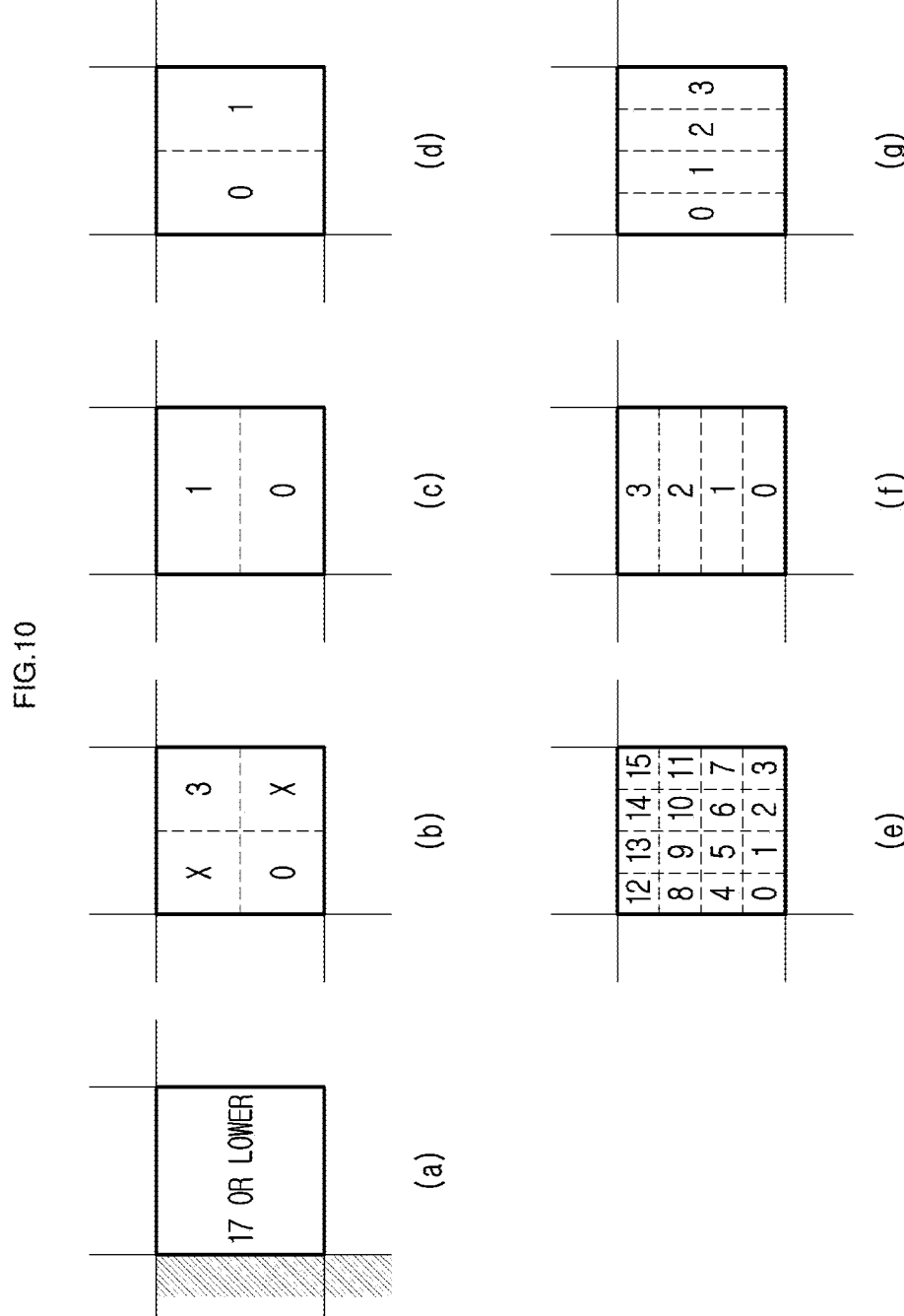
FIG. 10 is an exemplary diagram illustrating coding orders available in diagonal up right prediction modes according to an embodiment of the present disclosure.

FIG. 10 illustrates an example of coding orders available in diagonal up right modes according to an embodiment of the present disclosure. An example in which a higher priority is assigned to the bottom-left neighbor subblock may be provided in FIGS. 10(a) to 10(g).

Figure 11:
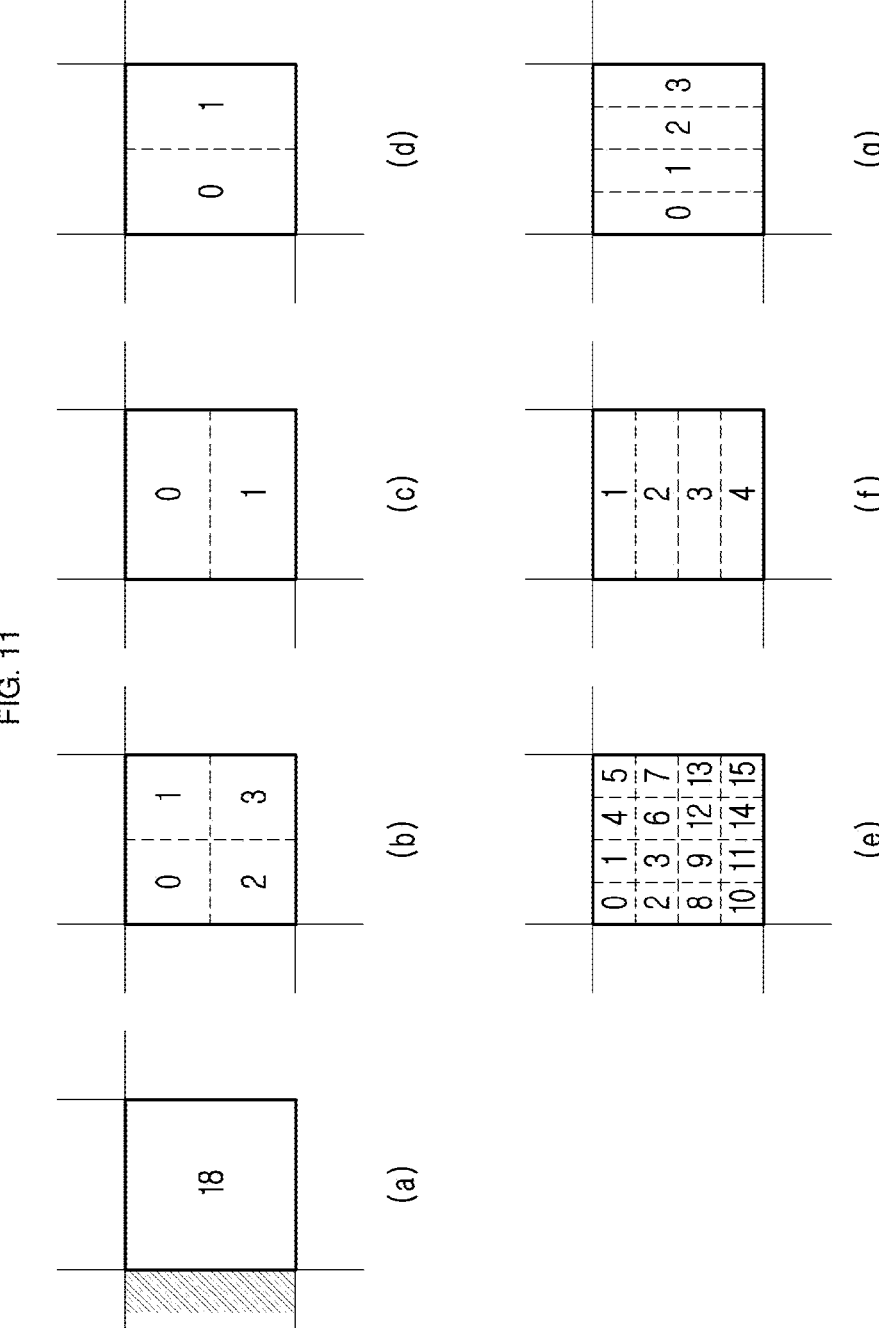
FIG. 11 is an exemplary diagram illustrating coding orders available in horizontal modes according to an embodiment of the present disclosure.

FIG. 11 illustrates an example of coding orders available in horizontal modes according to an embodiment of the present disclosure. An example in which a higher priority is assigned to the left neighbor subblock may be provided in FIGS. 11(a) to 11(g).

Figure 12:
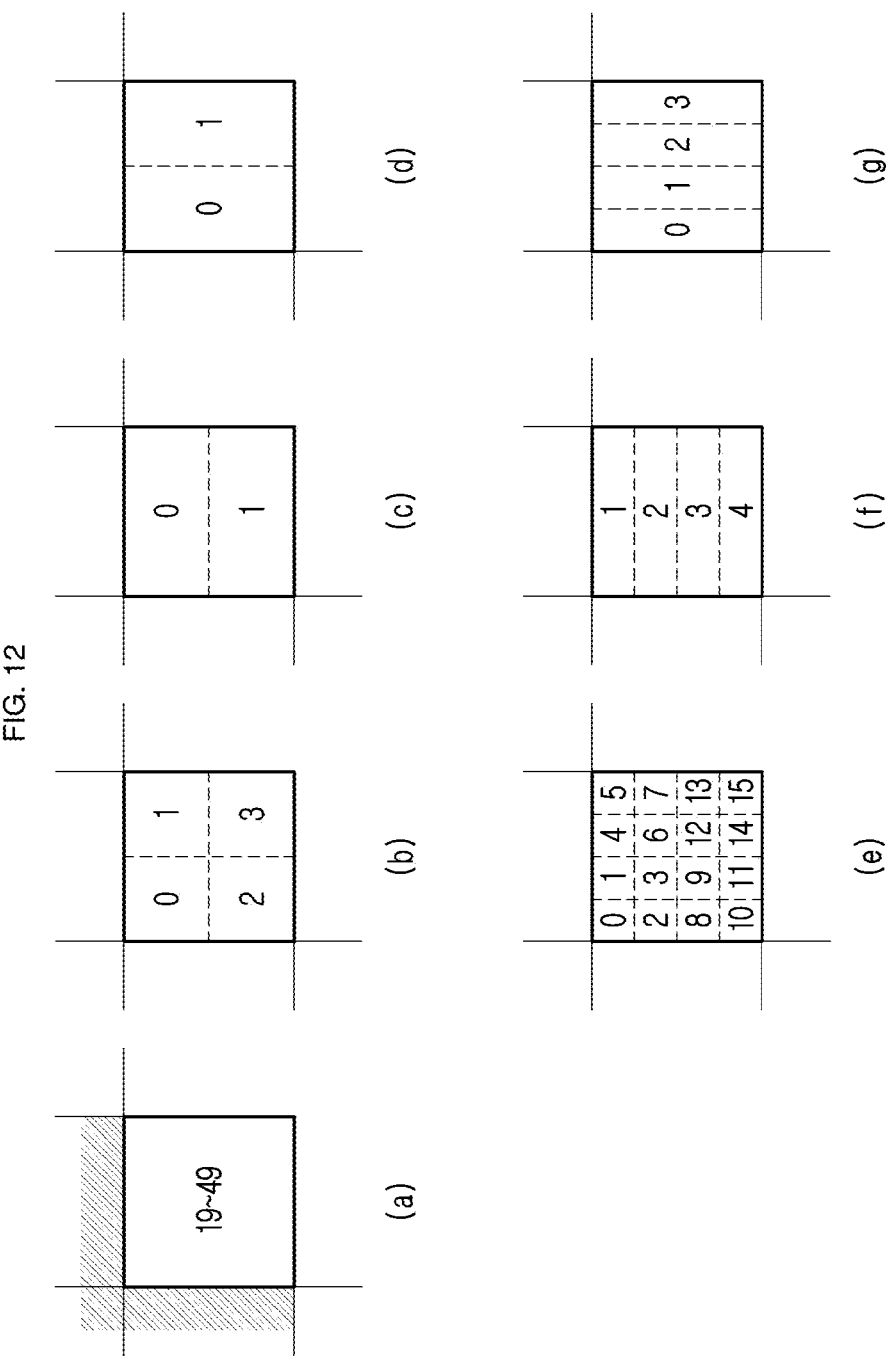
FIG. 12 is an exemplary diagram illustrating coding orders available in diagonal down right prediction modes according to an embodiment of the present disclosure.

FIG. 12 illustrates an example of coding orders available in diagonal down right modes according to an embodiment of the present disclosure. An example in which a higher priority is assigned to the top-left neighbor subblock may be provided in FIGS. 12(a) to 12(g).

Figure 13:
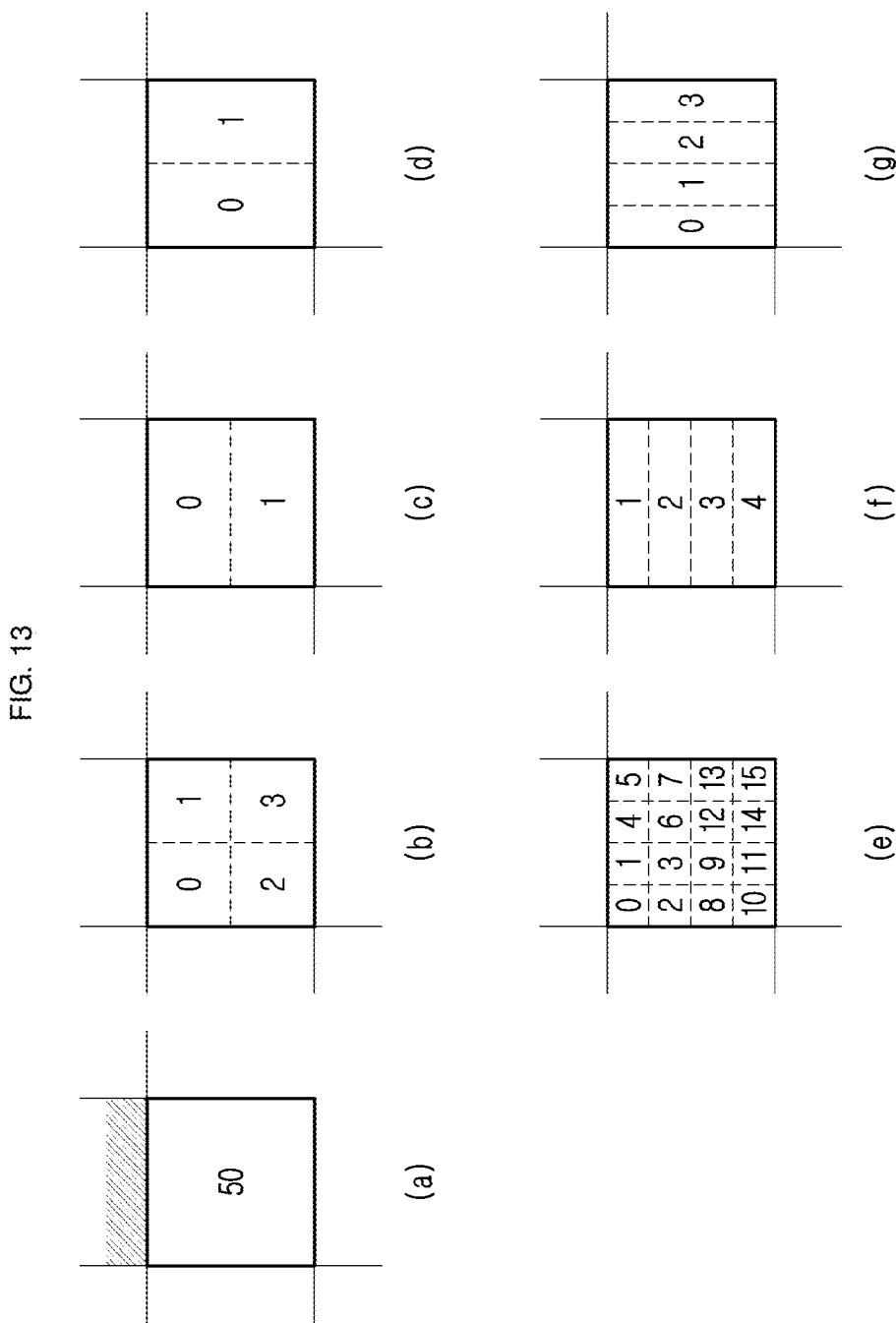
FIG. 13 is an exemplary diagram illustrating coding orders available in vertical modes according to an embodiment of the present disclosure.

FIG. 13 illustrates an example of coding orders available in vertical modes according to an embodiment of the present disclosure. An example in which a higher priority is assigned to the top neighbor subblock may be provided in FIGS. 13(a) to 13(g).

Figure 14:
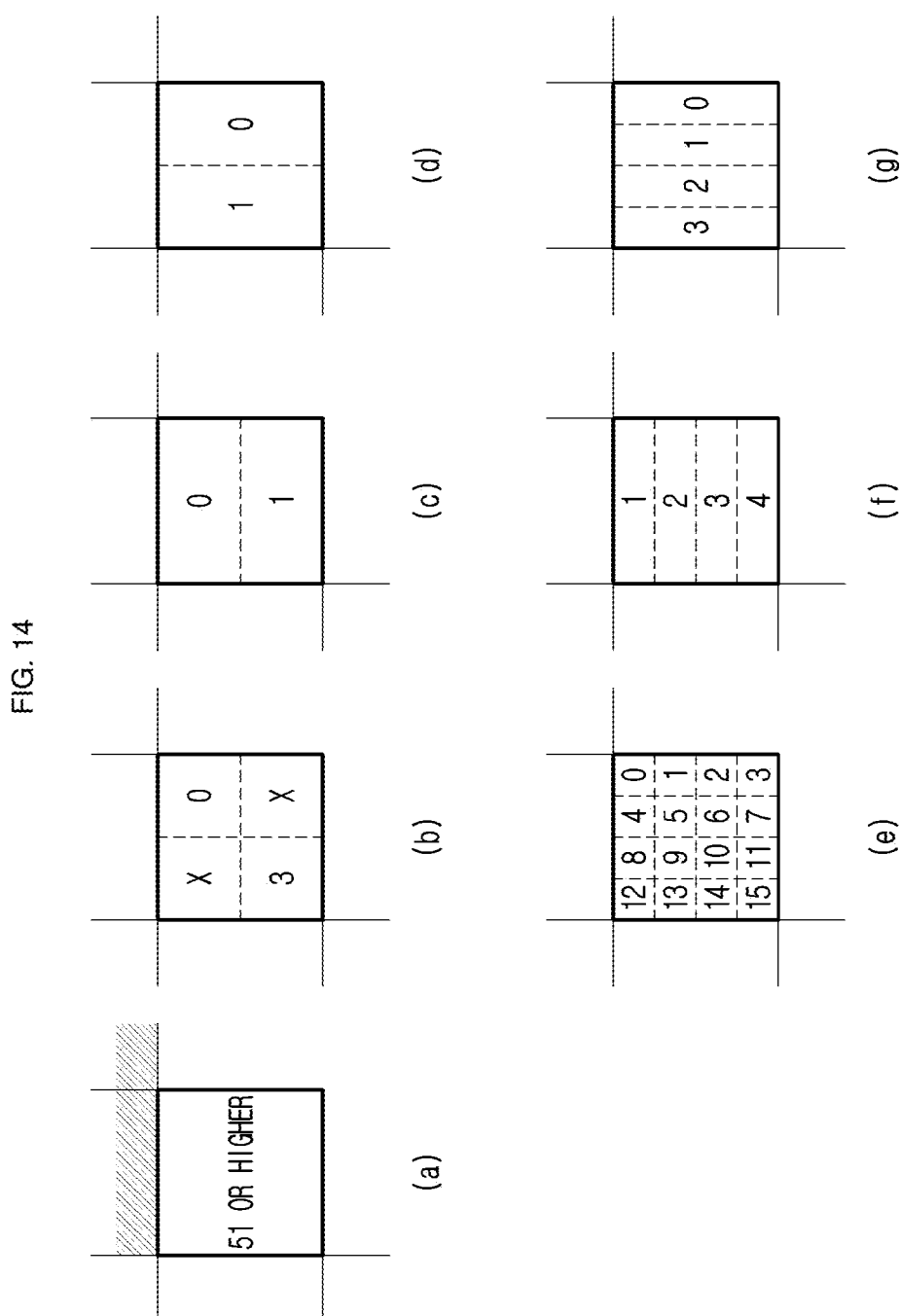
FIG. 14 is an exemplary diagram illustrating coding orders available in diagonal down left prediction modes according to an embodiment of the present disclosure.

FIG. 14 illustrates an example of coding orders available in diagonal down left modes according to an embodiment of the present disclosure. An example in which a higher priority is assigned to the top-right neighbor subblock may be provided in FIGS. 14(a) to 14(g).

In the above examples, a coding order is defined from a neighbor region completely encoded/decoded, and other modification examples are also available. In addition, various configurations in which a coding order is defined according to other encoding/decoding factors may be possible.

Figure 15:
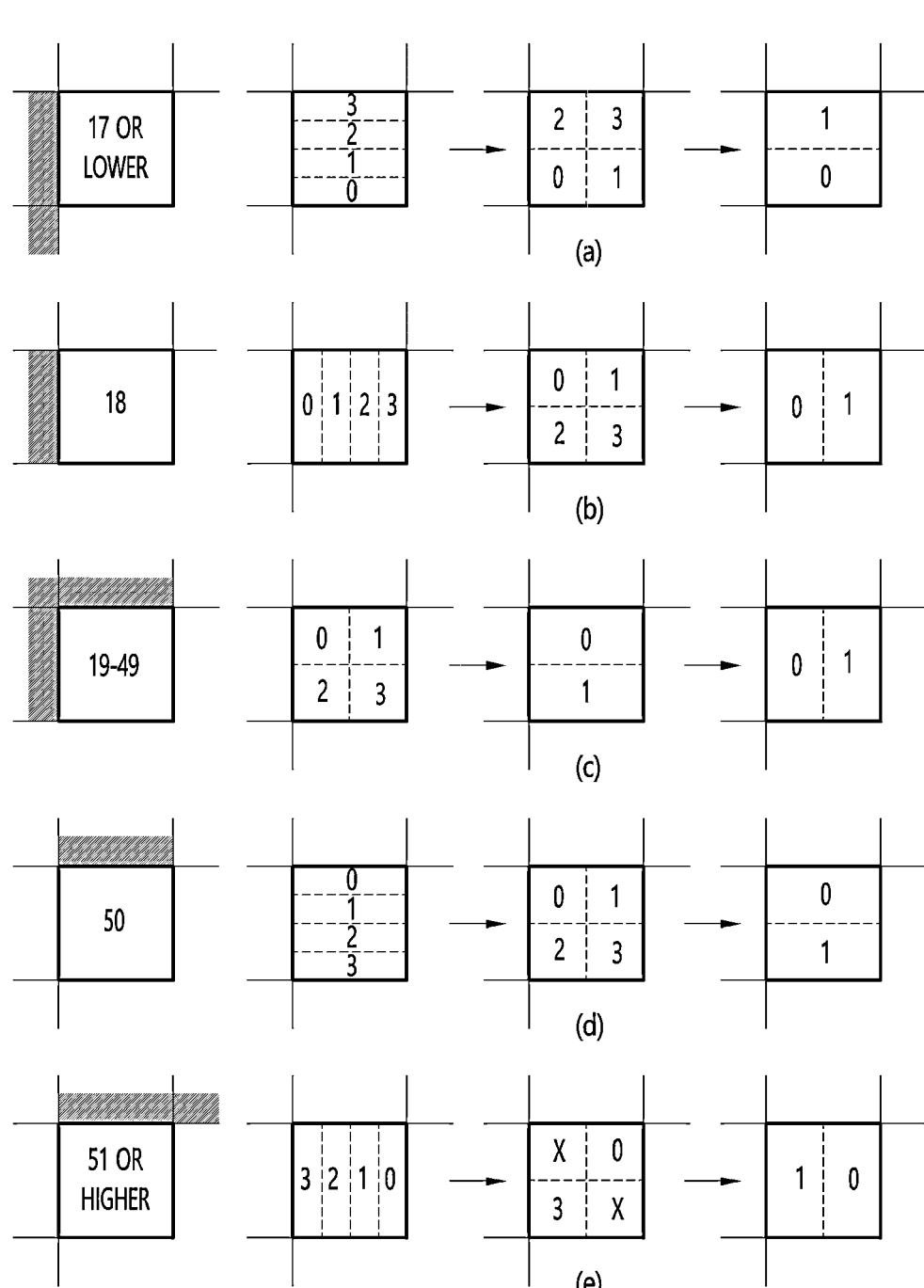
FIG. 15 is an exemplary diagram illustrating coding orders based on intra-prediction modes and partition types according to an embodiment of the present disclosure.

FIG. 15 is an exemplary diagram illustrating coding orders in consideration of intra-prediction modes and partition types according to an embodiment of the present disclosure. Specifically, a coding order of subblocks may be implicitly determined for each partition type according to an intra-prediction mode. In addition, an example of, in the presence of an unobtainable partition type, reconfiguring a candidate group by replacing the unobtainable partition type with another partition type is described. For the convenience of description, it is assumed that a parent block is of size 4M×4N.

Referring to FIG. 15(a), for subblock-wise intra-prediction, the parent block may be split into a 4M×N-form. In this example, the inverse vertical scan order may be used. If the 4M×N partition type is not available, the parent block may be split into 2M×2N-partitions according to a predetermined priority. Since the coding order for this case is illustrated in FIG. 15(a), its detailed description is not provided herein. If the 2M×2N-partition type is not available, the parent block may be split into 4M×2N-partitions of the next priority. As such, a partition type based on a predetermined priority may be supported, and the parent block may be partitioned into subblocks accordingly. If all of the predefined partition types are unavailable, it may be noted that it is impossible to split the parent block into subblocks, and thus the parent block is encoded.

Referring to FIG. 15(b), for subblock-wise intra-prediction, the parent block may be split into an M×4N form. As in FIG. 15(a), it is assumed that a coding order is predetermined based on each partition type. This example may be understood as a case of replacement in the order of 2M×2N and 2M×4N.

Referring to FIG. 15(c), for subblock-wise intra-prediction, the parent block may be split into 2M×2N-partitions. This example may be understood as a case of replacement in the order of 4M×2N and 2M×4N.

Referring to FIG. 15(d), for subblock-wise intra-prediction, the parent block may be split into 4M×N-partitions. This example may be understood as a case of replacement in the order of 2M×2N and 4M×2N.

Referring to FIG. 15(e), for subblock-wise intra-prediction, the parent block may be split into M×4N-partitions. This example may be understood as a case of replacement in the order of 2M×2N and 2M×4N.

In the above examples, when there is an available partition type, partitioning into another partition type in a predetermined order is supported. Various modification examples are available.

For example, in the case where the partition types of {4M×4N, M×4N, 4M×N} are supported, when the M×4N or 4M×N partition type is not available, this partition type may be replaced with 2M×4N or 4M×2N.

As in the above examples, a subblock partitioning configuration may be determined according to various encoding/decoding factors. Since the encoding/decoding factors may be derived from the foregoing description of subblock partitioning, their detailed description is not provided herein.

Further, when subblock partitioning is determined, prediction and transform may be performed as it is. As described above, an intra-prediction mode may be determined at the parent block level, and prediction may be performed accordingly.

Further, transformation and inverse transformation may be configured based on a parent block, and transformation and inverse transformation may be performed at the sub-block level based on the configuration based on the parent block. Alternatively, a related configuration may be determined based on subblocks and transformation and inverse transformation may be performed at the subblock level according to the configuration. The transformation and inverse transformation may be performed based on one of the above configurations.

The methods of the present disclosure may be implemented as program instructions executable by various computer means, and stored in a non-transitory computer-readable recording medium. The non-transitory computer-readable recording medium may include program instructions, data files, and data structures alone or in combination. The program instructions recorded on the non-transitory computer-readable recording medium may be specially designed for the present disclosure or known to those skilled in the art of computer software and thus available.

The non-transitory computer-readable recording medium may include a hardware device specially adapted to store and execute program instructions, such as a read only memory (ROM), a random access memory (RAM), a flash memory, and the like. Program instructions may include machine language code that is produced by a compiler or high-level language code that may be executed in a computer by an interpreter. The above-described hardware device may be configured to operate as one or more software modules in order to perform operations according to the present disclosure, and vice versa.

Further, the above-described method or apparatus may be implemented in full or partial combination or separation of its configurations or functions.

While the present disclosure has been described above with reference to preferred embodiments of the present disclosure, those skilled in the art will understand that various modifications and variations can be made to the present disclosure without departing from the scope and spirit of the present disclosure.

INDUSTRIAL APPLICABILITY

The present disclosure may be used in image encoding/decoding.

The invention claimed is:

1. An image decoding method performed by an image decoding apparatus, the method comprising:
generating, by the image decoding apparatus, a prediction block of a coding block by performing intra prediction;
generating, by the image decoding apparatus, a residual block of the coding block; and
reconstructing, by the image decoding apparatus, the coding block based on the prediction block and the residual block,
wherein the residual block is generated by decoding information on the residual block included in a bit-stream,
wherein the coding block is reconstructed by adding the prediction block and the residua block,
wherein an intra prediction mode for the coding block is derived from two or more intra prediction mode groups,
wherein each of the two or more intra prediction mode groups comprises one or more intra prediction modes, wherein one among the two or more intra prediction mode groups is composed of only one intra prediction mode, the only one intra prediction mode being a planar mode, and
wherein when deriving the intra prediction mode for the coding block, the one among the two or more intra prediction mode groups including the only one intra prediction mode is considered prior to the remaining intra prediction mode groups among the two or more intra prediction mode groups.

2. The method of claim 1,
wherein one among the two or more intra prediction mode groups comprises a plurality of intra prediction modes derived based on a neighboring block of the coding block.

3. The method of claim 2,
wherein the plurality of intra prediction modes comprises a mode derived by adding 2 to or subtracting 2 from an intra prediction mode for the neighboring block of the coding block.

4. The method of claim 1,
wherein the intra prediction mode for the coding block is derived from the two or more intra prediction mode groups based on a reference sample line to which reference samples for the intra prediction belong.

5. An image encoding method performed by an image encoding apparatus, the method comprising:
generating, by the image encoding apparatus, a prediction block of a coding block by performing intra prediction;
generating, by the image encoding apparatus, a residual block of the coding block based on the prediction block; and
encoding, by the image encoding apparatus, the coding block by encoding the residual block,
wherein the residual block is generated by subtracting the prediction block from the coding block,
wherein the coding block is encoded by encoding information on the residual block into a bitstream,
wherein an intra prediction mode for the coding block is encoded based on two or more intra prediction mode groups,
wherein each of the two or more intra prediction mode groups comprises one or more intra prediction modes,
wherein one among the two or more intra prediction mode groups is composed of only one intra prediction mode, the only one intra prediction mode being a planar mode, and
wherein when encoding the intra prediction mode for the coding block, the one among the two or more intra prediction mode groups including the only one intra prediction mode is considered prior to the remaining intra prediction mode groups among the two or more intra prediction mode groups.

6. A method of transmitting a bitstream generated by an image encoding method performed by an image encoding apparatus, the method comprising:
generating, by the image encoding apparatus, a prediction block of a coding block by performing intra prediction;
generating, by the image encoding apparatus, a residual block of the coding block based on the prediction block;
encoding, by the image encoding apparatus, the coding block into the bitstream by encoding the residual block; and
transmitting, by the image encoding apparatus, the bit-stream to an image decoding apparatus, wherein the residual block is generated by subtracting the prediction block from the coding block, wherein the coding block is encoded by encoding information on the residual block into the bitstream, wherein an intra prediction mode for the coding block is encoded based on two or more intra prediction mode groups, wherein each of the two or more intra prediction mode groups comprises one or more intra prediction modes, wherein one among the two or more intra prediction mode groups is composed of only one intra prediction mode, the only one intra prediction mode being a planar mode, and wherein when encoding the intra prediction mode for the coding block, the one among the two or more intra prediction mode groups including the only one intra prediction mode is considered prior to the remaining intra prediction mode groups among the two or more intra prediction mode groups.

7. A non-transitory computer-readable recording medium storing a bitstream generated by an image encoding method performed by an image encoding apparatus, the method comprising:

generating, by the image encoding apparatus, a prediction block of a coding block by performing intra prediction;

generating, by the image encoding apparatus, a residual block of the coding block based on the prediction block; and encoding, by the image encoding apparatus, the coding block by encoding the residual block, wherein the residual block is generated by subtracting the prediction block from the coding block, wherein the coding block is encoded by encoding information on the residual block into the bitstream, wherein an intra prediction mode for the coding block is encoded based on two or more intra prediction mode groups, wherein each of the two or more intra prediction mode groups comprises one or more intra prediction modes, wherein one among the two or more intra prediction mode groups is composed of only one intra prediction mode, the only one intra prediction mode being a planar mode, and wherein when encoding the intra prediction mode for the coding block, the one among the two or more intra prediction mode groups including the only one intra prediction mode is considered prior to the remaining intra prediction mode groups among the two or more intra prediction mode groups.

* * * * *